United States Patent
Lee, Jr. et al.

(10) Patent No.: US 7,741,130 B2
(45) Date of Patent: Jun. 22, 2010

(54) FLUIDIC ARRAYS AND METHOD OF USING

(75) Inventors: Jessamine Lee, Jr., Cambridge, MA (US); Rustem F. Ismagilov, Chicago, IL (US); Xingyu Jiang, Arlington, MA (US); Paul J. A. Kenis, Champaign, IL (US); Rosaria Ferrigno, Bron (FR); George M. Whitesides, Newton, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 1850 days.

(21) Appl. No.: 10/783,983

(22) Filed: Feb. 20, 2004

(65) Prior Publication Data

US 2004/0258571 A1 Dec. 23, 2004

Related U.S. Application Data

(63) Continuation-in-part of application No. PCT/US02/26459, filed on Aug. 20, 2002.

(60) Provisional application No. 60/313,644, filed on Aug. 20, 2001.

(51) Int. Cl.
*G01N 11/00* (2006.01)
*G01N 33/53* (2006.01)

(52) U.S. Cl. .................... 436/809; 436/86; 436/180

(58) Field of Classification Search .............. 422/50, 422/68.1, 99, 100, 103, 129, 130, 188, 196, 422/197, 939, 940, 942, 946, 947, 948; 436/514, 436/515, 516, 86–90, 174, 180, 807, 809
See application file for complete search history.

(56) References Cited

U.S. PATENT DOCUMENTS

| 5,376,252 | A | 12/1994 | Ekström et al. |
| 5,681,484 | A | 10/1997 | Zanzucchi et al. |
| 5,842,787 | A | 12/1998 | Kopf-Sill et al. |

(Continued)

FOREIGN PATENT DOCUMENTS

WO    WO 03/015890 A1    2/2003

OTHER PUBLICATIONS

S. Hediger et al., Biosystem for the Culture and Characterization of Epithelial Cell Tissues, 63 Sensors and Actuators B 63-73 (2000).*

(Continued)

*Primary Examiner*—Glenn Caldarola
*Assistant Examiner*—Randy Boyer
(74) *Attorney, Agent, or Firm*—Wolf, Greenfield & Sacks, P.C.

(57) ABSTRACT

The present invention relates to fluidic systems and, in particular, fluidic arrays and methods for using them to promote interaction of materials. In one embodiment, the present invention is directed to a microfluidic system. The microfluidic system includes a first fluid path and a second fluid path segregated from the first fluid path by a first convection controller at a first contact region, wherein at least one of the first fluid path and the second fluid path has a cross-sectional dimension of less than about 1 millimeter. In another aspect, the present invention is directed to a method of promoting interaction. In another aspect, the invention relates to a device and method for performing titrations.

23 Claims, 22 Drawing Sheets

U.S. PATENT DOCUMENTS

| | | | |
|---|---|---|---|
| 5,846,395 | A | 12/1998 | Sarrine et al. |
| 5,876,675 | A | 3/1999 | Kennedy |
| 5,885,470 | A | 3/1999 | Parce et al. |
| 6,004,515 | A | 12/1999 | Parce et al. |
| 6,033,544 | A | 3/2000 | Demers et al. |
| 6,048,498 | A | 4/2000 | Kennedy |
| 6,068,752 | A | 5/2000 | Dubrow et al. |
| 6,071,478 | A | 6/2000 | Chow |
| 6,120,736 | A | 9/2000 | Ploug et al. |
| 6,129,973 | A * | 10/2000 | Martin et al. ............... 422/190 |
| 6,149,787 | A | 11/2000 | Chow et al. |
| 6,149,870 | A | 11/2000 | Parce et al. |
| 6,167,910 | B1 | 1/2001 | Chow |
| 6,210,986 | B1 | 4/2001 | Arnold et al. |
| 6,235,175 | B1 | 5/2001 | Dubrow et al. |
| 6,251,343 | B1 | 6/2001 | Dubrow et al. |
| 6,321,791 | B1 | 11/2001 | Chow |
| 6,395,559 | B1 | 5/2002 | Swenson |
| 6,447,661 | B1 | 9/2002 | Chow et al. |
| 6,645,432 | B1 | 11/2003 | Anderson et al. |
| 6,653,089 | B2 | 11/2003 | Takayama |
| 6,686,184 | B1 | 2/2004 | Anderson et al. |
| 6,705,357 | B2 | 3/2004 | Jeon et al. |
| 6,806,543 | B2 | 10/2004 | Yamakawa et al. |
| 6,858,185 | B1 * | 2/2005 | Kopf-Sill et al. ............ 422/103 |
| 7,220,345 | B2 * | 5/2007 | Bohn et al. ................. 422/100 |

OTHER PUBLICATIONS

J. Gao et al., Integrated Microfluidic System Enabling Protein Digestion, Peptide Separation and Protein Identification, 73 Anal. Chem. 2648-2655 (2001).*

J.K. Beattie, The Intrinsic Charge on Hydrophobic Microfluidic Substrates, 6 Lab Chip 1409-1411 (2006).*

J. Khandurina et al., Microfabricated Porous Membrane Structure for Sample Concentration and Electrophoretic Analysis, 71 Anal. Chem. 1815-1819 (1999).*

Ismagilov, Rustem F., et al., "Microfluidic Arrays of Fluid-Fluid Diffusional Contacts as Detection Elements and Combinatorial Tools," *Anal Chem.* 2001, 73, pp. 5207-5213.

International Search Report in International Application No. PCT/US02/26459, mailed Jan. 27, 2003.

International Preliminary Examination Report in International Application No. PCT/US02/26459, mailed Aug. 20, 2003.

Ismagilov, R., et al., "Microfluidic Arrays of Fluid-Fluid Diffusional Contacts as Detection Elements and Combinatorial Tools," *Anal. Chem.*, vol. 73, pp. 5207-5213 (2001).

* cited by examiner

100 μm

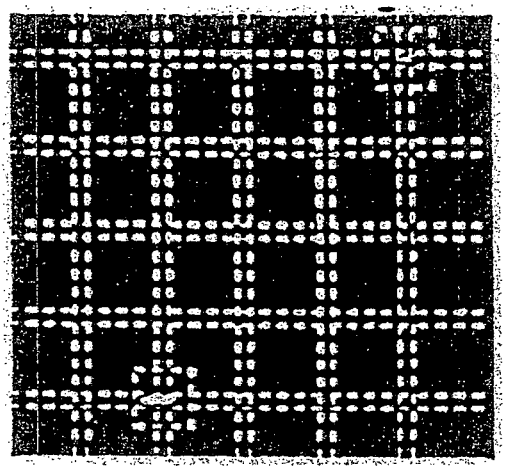
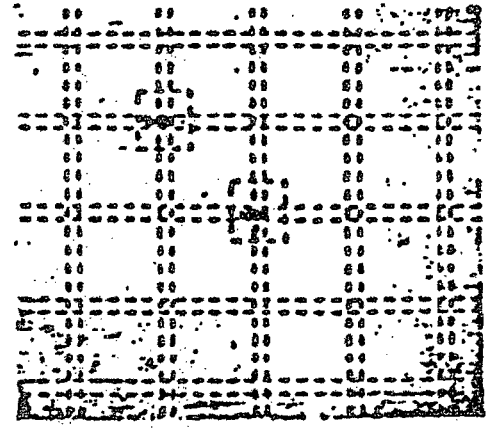
FIG. 14          FIG. 15
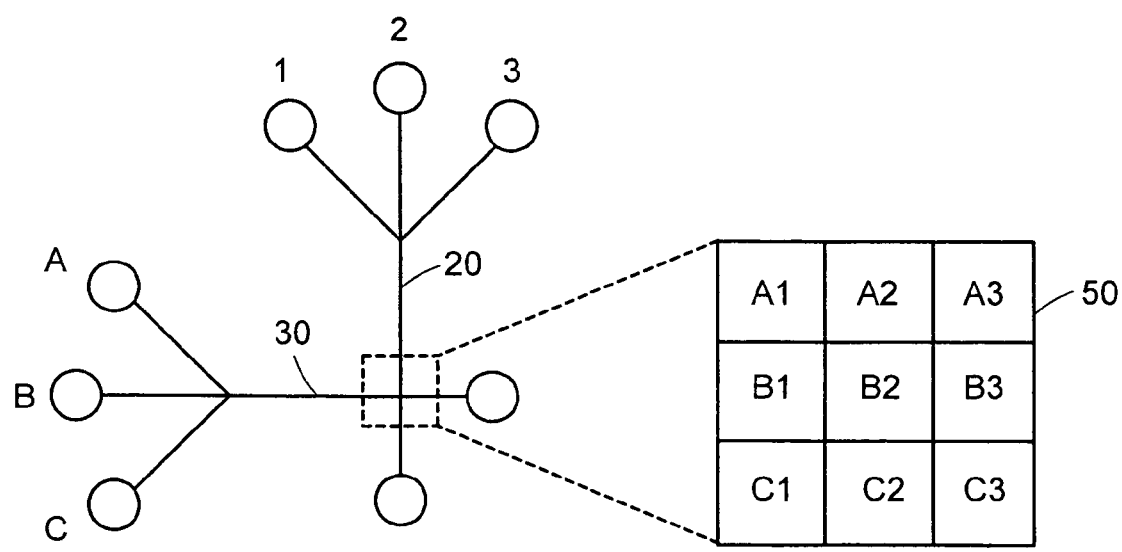
FIG. 16

A

B

FLUIDIC ARRAYS AND METHOD OF USING

RELATED APPLICATIONS

This application is a continuation in part application of International Application No. PCT/US02/26459, filed Aug. 20, 2002 and published in English, and claims priority to U.S. patent application Ser. No. 60/313,644, filed Aug. 20, 2001. Both applications are incorporated herein by reference.

FEDERALLY SPONSORED RESEARCH

This invention was sponsored in part by the National Science Foundation under Grant Nos. ECS-0004030 and ECS-9729405, and by NIH under Grant No. GM65364. The government has certain rights in the invention.

FIELD OF THE INVENTION

The present invention relates to fluidic systems and, in particular, fluidic arrays and methods for using them to promote interaction of materials.

BACKGROUND OF THE INVENTION

Performing multiple tests on a material, a single test on multiple materials or multiple tests on multiple materials may be a time consuming and labor intensive process. For example, in a screening test where an indicator is used to detect the presence of a particular substance in a variety of materials, the indicator must be added to each of the materials and the results must be individually observed.

In some cases, the process of performing multiple tests may be performed in a tray containing multiple wells (multi-well plate). For example, each well may be filled with an indicator and test material may be added to each well. Such an arrangement may facilitate observation of results and processing, such as incubation, required to achieve the results. However, filling each well individually remains time consuming and, as the number of materials to be tested and number of tests increase, the number of wells required to do all of the tests increases geometrically. A system capable of reducing the amount of time and labor required to perform multiple tests is desirable. A small and simple system is particularly desirable.

Microfluidic systems have received attention recently as creating the possibility of fabricating compact, integrated devices for analytical functions such as sensing, diagnosis and genomic analysis. Microfluidic systems are flow systems miniaturized to dimensions typically as small as a few micrometers (μm). Such systems present challenges in both their design and manufacture. For example, at the level of miniaturization of typical microfluidic systems, fluid flow is predominantly laminar and the effects of diffusion, surface tension and viscosity may be emphasized.

SUMMARY OF THE INVENTION

In one embodiment, the present invention is directed to a microfluidic system. The microfluidic system includes a first fluid path and a second fluid path segregated from the first fluid path by a first convection controller at a first contact region, wherein at least one of the first fluid path and the second fluid path has a cross-sectional dimension of less than about 1 millimeter.

In another embodiment, the present invention is directed to a fluidic system including a first fluid path, a second fluid path, a third fluid path segregated from the first fluid path by a convection controller at a first contact region and the second fluid path by a convection controller at a second contact region, and a fourth fluid path segregated from the first fluid path by a convection controller at a third contact region and segregated from the second fluid flow path by a fourth convection controller at a fourth contact region.

In another embodiment, the present invention is directed to a fluidic array including a first set of fluid paths arranged generally parallel to one another, a second set of fluid paths arranged generally parallel to one another and crossing the first set of fluid paths such that a plurality of contact regions are formed between at least some of the fluid paths in the first set of fluid paths and at least some of the fluid paths in the second set of fluid paths, and a convection controller segregating one of the first set of fluid paths from one of the second set of fluid paths at the contact region.

In another embodiment, the present invention is directed to a method of promoting interaction. The method of promoting interaction includes introducing a first fluid including a first material into a first fluid path having a cross-sectional dimension of less than 1 millimeter, introducing a second fluid including a second material into a second fluid path segregated from the first fluid path by a convection controller at a contact region, and allowing the first and second materials to interact at the contact region.

In another embodiment, the present invention is directed to a method of immobilizing a material in a microfluidic system. The method of immobilizing a material in a microfluidic system includes the step of introducing an immobilizer containing the material into a fluid path having a cross-sectional dimension of less than about 1 millimeter.

In another embodiment, the present invention is directed to a microfluidic system including a fluid path having a cross-sectional dimension of less than about 1 millimeter and an immobilizer positioned within the fluid path.

In another embodiment, the present invention is directed to a method of patterning a material on a substrate. The method includes placing a first fluid path in fluid contact with the substrate, flowing a fluid comprising the material into the first fluid path, and immobilizing at least a portion of the material within the first fluid path. The method further includes removing the first fluid path from the substrate, leaving at least a portion of the immobilized material in contact with the substrate, and placing a second fluid path in fluid contact with the substrate such that the second fluid path is in fluid contact with at least a portion of the immobilized material.

In another embodiment, the present invention is directed to fluidic device including a substrate with a material patterned thereon and a fluid path in fluid contact with the substrate such that the fluid path is in fluid contact with at least a portion of the material.

In another embodiment, the present invention is directed to method of promoting interaction. The method includes providing a fluidic system comprising a fluid path having a cross-sectional dimension of less than one millimeter and a first interaction material patterned therein, and flowing a fluid comprising a second interaction material into the fluid path to allow interaction between the first and second interaction materials.

In another embodiment, the present invention is directed to gradient generation apparatus including at least first, second, and third fluid paths, each having a cross-section of less than one millimeter, the second and third fluid paths each comprising a mixing region. The apparatus also includes a first inlet fluidly connected to the first and second fluid paths and a second inlet fluidly connected to the second and third fluid paths. The apparatus further includes a first connecting path fluidly connected to the second fluid path downstream of its mixing region and fluidly connected to the third fluid path upstream of its mixing region.

In another embodiment, the present invention is directed to a method. The method includes flowing a first fluid into a first channel, flowing a second fluid into a second channel, mixing at least a portion of the first fluid with a portion of the second fluid in a third channel to form a third fluid, mixing at least a portion of the third fluid with a portion of the second fluid to form a fourth fluid, flowing the third fluid past a first sensor, and flowing the fourth fluid past a second sensor.

In another embodiment, the present invention is directed to an apparatus. The apparatus may include at least first, second, and third fluid paths each having an inlet end and a region downstream from the inlet end, the inlet of the first fluid path being fluidly connectable to a first source of fluid, the inlets of the second and third fluid paths being fluidly connectable to a second source of fluid, a first connecting path fluidly connecting the first fluid path and the second fluid path downstream of the inlet end of each, and a second connecting path fluidly connecting the second fluid path and the third fluid path downstream of the inlet end of each and downstream of the connection of the second fluid path to the first connecting path.

In another embodiment, the present invention is directed to a method. The method includes flowing a first fluid in a first channel and a second fluid in a second channel and in a third channel, mixing at least a portion of the first fluid with the second fluid in the second channel to produce a third fluid, and mixing at least a portion of the third fluid with the second fluid in the third channel to produce a fourth fluid.

Other advantages, novel features, and objects of the invention will become apparent from the following detailed description of the invention when considered in conjunction with the accompanying drawings, which are not intended to be drawn to scale and some of which are schematic. In the figures, each identical or nearly identical component that is illustrated in various figures is represented by a single numeral. For purposes of clarity, not every component is labeled in every figure, nor is every component of each embodiment of the invention shown where illustration is not necessary to allow those of ordinary skill in the art to understand the invention.

BRIEF DESCRIPTION OF THE DRAWINGS

FIG. 14 is a photocopy of a photomicrograph of one aspect of the embodiment of FIG. 13;

FIG. 15 is a photocopy of a photomicrograph of another aspect of the embodiment of FIG. 13;

FIG. 16 is a top, plan view of a fluidic system according to another embodiment of the present invention;

DETAILED DESCRIPTION

Figure 1:
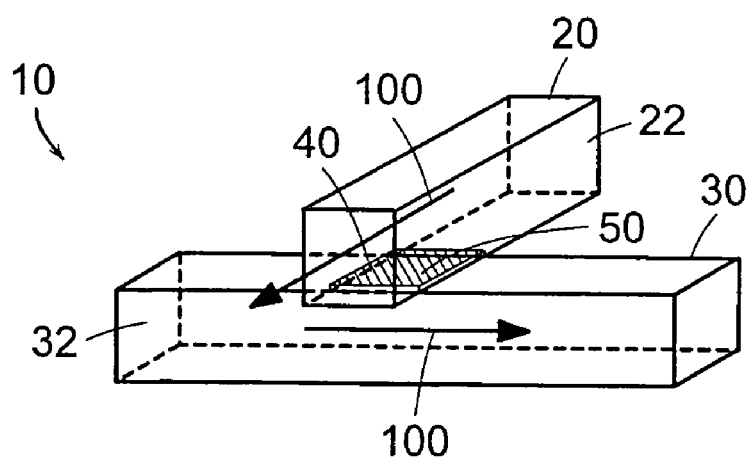
FIG. 1 is perspective, plan view of a fluidic system according to one embodiment of the present invention.

The present invention is directed to a fluidic system. "Fluidic system," as used herein, refers to a device, apparatus or system including at least one fluid path. In many embodiments of the invention, the fluidic system is a microfluidic system. In some, but not all embodiments, all components of the systems and methods described herein are microfluidic. "Microfluidic," as used herein, refers to a device, apparatus or system including at least one fluid channel having a cross-sectional dimension of less than 1 mm, and a ratio of length to largest cross-sectional dimension of at least 3:1. A "microfluidic channel," as used herein, is a channel meeting these criteria.

The "cross-sectional dimension" of the channel is measured perpendicular to the direction of fluid flow. Many fluid channels in components of the invention have maximum cross-sectional dimensions less than 2 mm, and in some cases, less than 1 mm. In one set of embodiments, all fluid channels containing embodiments of the invention are microfluidic or have a largest cross sectional dimension of no more than 2 mm or 1 mm. In another embodiment, the fluid channels may be formed in part by a single component (e.g. an etched substrate or molded unit). Of course, larger channels, tubes, chambers, reservoirs, etc. can be used to store fluids in bulk and to deliver fluids to components of the invention. In one set of embodiments, the maximum cross-sectional dimension of the channel(s) containing embodiments of the invention are less than 500 microns, less than 200 microns, less than 100 microns, less than 50 microns, or less than 25 microns.

A "channel," as used herein, means a feature on or in an article (substrate) that at least partially directs the flow of a fluid. The channel can have any cross-sectional shape (circular, oval, triangular, irregular, square or rectangular, or the like) and can be covered or uncovered. In embodiments where it is completely covered, at least one portion of the channel can have a cross-section that is completely enclosed, or the entire channel may be completely enclosed along its entire length with the exception of its inlet(s) and outlet(s). A channel may also have an aspect ratio (length to average cross sectional dimension) of at least 2:1, more typically at least 3:1, 5:1, or 10:1 or more. An open channel generally will include characteristics that facilitate control over fluid transport, e.g., structural characteristics (an elongated indentation) and/or physical or chemical characteristics (hydrophobicity vs. hydrophilicity) or other characteristics that can exert a force (e.g., a containing force) on a fluid. The fluid within the channel may partially or completely fill the channel. In some cases where an open channel is used, the fluid may be held within the channel, for example, using surface tension (i.e., a concave or convex meniscus).

The channel may be of any size, for example, having a largest dimension perpendicular to fluid flow of less than about 5 mm or 2 mm, or less than about 1 mm, or less than about 500 microns, less than about 200 microns, less than about 100 microns, less than about 60 microns, less than about 50 microns, less than about 40 microns, less than about 30 microns, less than about 25 microns, less than about 10 microns, less than about 3 microns, less than about 1 micron, less than about 300 nm, less than about 100 nm, less than about 30 nm, or less than about 10 nm. In some cases the dimensions of the channel may be chosen such that fluid is able to freely flow through the article or substrate. The dimensions of the channel may also be chosen, for example, to allow a certain volumetric or linear flow rate of fluid in the channel. Of course, the number of channels and the shape of the channels can be varied by any method known to those of ordinary skill in the art.

"Fluid path," as used herein, refers to any channel, tube, pipe or pathway through which a fluid, such as a liquid or a gas, may pass. "Enclosed fluid path," as used herein, refers to any fluid path that is substantially contained except at inlets, outlets, contact regions, and the like. "Crossing angle," as used herein, refers to the angle between two intersecting fluid paths measured between a portion of each fluid path upstream of a contact region between two fluid paths. Accordingly, a crossing angle of 180° indicates the fluid paths overlap completely, but are flowing in opposite directions, while a crossing angle of 0° indicates that the fluid paths overlap completely and are flowing in the same direction. "Contact region," as used herein, refers to the area at which two fluid paths overlap. In most cases, a contact region is formed where a first fluid path is tangential to a second fluid path, though it is possible that there is some degree of overlap between the fluid paths, or that the fluid paths are separated by some distance, so long as some degree of fluid communication between the fluid paths is possible. "Convection controller," as used herein, refers to any device or system that inhibits convection, but allows at least some diffusion.

In one embodiment, the fluidic system of the present invention, which is illustrated in the following description of particular embodiments as a microfluidic system by way of example, includes a first fluid path and a second fluid path segregated from the first fluid path by a convection controller at a contact region. Referring now to FIG. 1, an embodiment of a microfluidic system will be described. This embodiment of a microfluidic system 10 may include a first fluid path 20 and a second fluid path 30 segregated from first fluid path 20 by a convection controller 50 at a first contact region 40.

In typical operation of the embodiment of microfluidic system 10 illustrated in FIG. 1, a first fluid is introduced, for example by pumping or gravity feed, into first fluid path 20 through a first inlet 22 and a second fluid is similarly introduced into second fluid path 30 through a second inlet 32. Following introduction, the first and second fluids flow through their respective fluid paths 20, 30 as illustrated by flow indicators 100, passing one another at contact region 40. Convection controller 50 inhibits convection between first fluid path 20 and second fluid path 30, while allowing at least some diffusion between them. The first fluid and second fluid may be, or contain, material to be interacted, such as reactants. For example, the first fluid may be a test material, such as a solution suspected of containing a particular enzyme, and the second fluid may be an indicator, such as a material that creates an observable response when exposed to the enzyme. When the fluids are introduced into flow paths 20, 30, mixing of the fluids by convection may be inhibited by convection controller 50, but diffusion of the fluids, or materials therein, such as the enzyme, indicator, or indicator and enzyme may be allowed. Accordingly, the materials may interact at contact region 40 and the response of the indicator may be observed there. In such an embodiment, contact region 40 is effectively a test site, performing a function similar to a test tube or well in a tray containing a test material and an indicator. In some embodiments, the indicator may pass through convection inhibitor 50, making flow path 20, 30 into a test site.

The present invention is not limited to a single pair of fluid paths 20, 30. For example, the embodiments illustrated in FIGS. 3 and 4 each include two pairs of fluid paths 20, 30, while the embodiment illustrated in FIG. 5 includes two sets of five fluid paths 20, 30. In these embodiments, fluid paths 20, 30 are arranged in two sets of parallel fluid paths having a crossing angle of about 90 degrees. As illustrated by the figures, such an arrangement increases the number of contacts regions 40 geometrically. For example, crossing two fluid paths creates one contact region, crossing two pairs of fluid paths creates four contact regions, crossing two sets of five fluid paths creates 25 contact regions, crossing two sets of 10 fluid paths creates 100 contact regions and so on. Because each contact region 40 may function as an interaction site, the number of interaction sites also grows geometrically as the number of fluid paths 20, 30 is increased. Accordingly, by introducing fluid into, for example, 20 fluid paths arranged as two sets of 10 fluid paths crossing one another, 100 interactions are able to be performed in parallel, representing a significant time savings over filling 100 wells with materials to be interacted, such as a test fluid and an indicator. Some of the many other possible arrangements of fluid paths and the materials that may introduced into the fluid paths are discussed below.

Fluid paths 20, 30 may be constructed in any manner and of any material(s) that allow a fluid to be introduced into fluid paths 20, 30 without adversely affecting or being affected by the fluid. For example, fluid paths 20, 30 may have any configuration or cross-sectional dimension that allows introduction of a fluid or fluids to be used with microfluidic system 10. In some embodiments, fluid paths 20, 30 may be constructed in a manner and of material(s) that allow a fluid to flow through fluid paths 20, 30 without adversely affecting or being affected by the fluid. For example, fluid paths 20, 30 may have any configuration or cross-sectional dimension that allows a fluid or fluids to be used with microfluidic system 10 to flow through fluid paths 20, 30 at an acceptable pressure drop.

In one embodiment, the cross-sectional dimension of fluid paths 20, 30 is as small as possible without inhibiting the introduction or flow of the fluid or fluids to be used with microfluidic system 10. For example, fluid paths 20, 30 may have a cross-sectional dimension of less than 1 millimeter (mm), preferably less than 500 micrometers (μm), more preferably less than 300 μm, still more preferably less than 100 μm and, most preferably, less than 50 μm. In certain embodiments, the fluid paths may have nanometer dimensions. For example, one ore more fluid paths may have cross-sectional dimensions of less than 1000 nanometers, less than 500 nanometers, less than 300 nanometers, less than 100 nanometers, or even as little as 50 or less nanometers, depending on the embodiment. However, it should be recognized that the preferred cross-sectional dimension of fluid paths 20, 30 will vary with the fluid(s) and application. For example, fluids including cells therein, such as blood, may suffer damage to the cells if the cross-sectional dimension is small. As a further example, fluids having a high viscosity may require excessive pumping pressure if the cross-sectional dimension is small.

The preferred configuration of fluid paths 20, 30 may vary with microfluidic system 10 and the fluid(s) to be used therein. Generally, fluid paths 20, 30 may be as straight and direct as possible from inlet to outlet to minimize pressure drop and reduce damage to time sensitive or shear sensitive liquids. However, in some instances, fluid paths 20, 30 may be preferred to be longer or more convoluted than otherwise necessary, such as where fluid paths 20, 30 serve as reactors or mixers wherein a residence time is desired. In some embodiments, a pair of crossing fluid paths 20, 30 may have configurations, such as matching lengths from inlet to contact region 40, to facilitate matching pressures within them. As discussed in more detail below, matching pressures across contact region 40 may further inhibit convection between the fluid paths and also may be less likely to bias diffusion in a particular direction, where such a bias is undesired.

Fluid paths 20, 30 may have a cross-section of any shape suitable for use with the desired fluid or fluids. For example, the cross-section of fluid paths 20, 30 may be polygonal, ovoid or of odd or irregular shape. The shape of fluid paths 20, 30 may influence the shape and size of contact region 40 and may be selected to provide a desired level of contact, and thus diffusion, between fluid paths 20, 30. For example, where it is desired to increase the area through which materials from fluid paths 20, 30 may diffuse, the size of contact region 40 may be maximized by altering the geometry of fluid paths 20, 30. For example, the cross-section of fluid paths 20, 30 may be flat on the side of each fluid path 20, 30 facing contact region 40. Alternatively, fluid paths 20, 30 may have corresponding structure that increases the surface area of contact region 40. For example, one fluid path 20 may have concave structure and the other fluid path 30 may have corresponding convex structure. In some embodiments, only small amounts of diffusion between fluid paths 20, 30 may be desired. In embodiments where only small amounts of diffusion between fluid paths 20, 30 is desired, the surface area of contact region 40 may be decreased accordingly. For example, fluid paths 20, 30 may have a taper toward contact region 40, such that the size of contact region 40 is reduced. The construction of convection controller 50 may also be modified to increase or decrease the amount of diffusion between fluid paths 20, 30, as described in greater detail below.

Fluids paths 20, 30 may include inlets 22, 32. Inlets 22, 32 may be constructed in any manner that allows fluid to be introduced into fluid paths 20, 30. For example, inlets 22, 32 may be constructed as injection ports, slits, funnels, other openings, or a combination of opening types. Inlets 22, 32 may be adapted to mate with an additional fluid path, pump, syringe, inkjet printing apparatus, robotic dispenser, or other device to facilitate the introduction of fluid into fluid paths 20, 30.

Fluid paths 20, 30 may be oriented with respect to one another in any manner that produces the desired number of contact regions 40. For example, fluid paths 20, 30 may overlap one another such that they are separated from one another only by convection controller 50. Such an arrangement may be referred to as tangentially intersecting fluid paths. Crossing angles between fluid paths 20, 30 may be any angle producing the desired contact region 40. For example, the crossing angle may be from about 5 to 175 degrees, about 25 to 155 degrees, about 45 to 135 degrees, about 60 to 120 degrees, or about 90 degrees. In some embodiments, fluid paths 20, 30 may have more than one contact region 40 between a single pair of fluid paths 20, 30. For example, fluid paths 20, 30 may be curved or zigzag in shape. An arrangement where there are multiple contact regions between two fluid paths may be of particular interest where it is desired to react constituents within fluid path 20 and to monitor the progress of the reaction with an indicator in fluid path 30. In such an embodiment, fluid path 20 may weave back and forth across fluid path 30.

In some embodiments, fluid paths 20, 30 may cross one another without having a contact region. For example, a substantially fluid impermeable barrier may be placed between fluid paths 20, 30, or fluid paths 20, 30 may be displaced from one another in a plane perpendicular to their general orientation. It should be appreciated that fluid paths 20, 30 need not have a plane of general orientation in all embodiments. For example, fluid paths 20, 30 may be constructed in three dimensions and may overlap or twist about one another, creating as many or as few contact regions 40 as desired.

In embodiments where more than two fluid paths 20, 30 are used, the fluid paths may be arranged in any manner that two fluid paths may be arranged and may further include fluid paths having a contact region with more than one other fluid path. In some embodiments, the arrangement of the fluid paths may be as straightforward as possible. For example, the fluid paths may be arranged in simple geometries, such as linear fluid paths having common crossing angles. In one embodiment, the fluid paths are arranged in two overlapping sets of fluid paths 20, 30. Such sets may have any number of fluid paths in each set. Where it is desired to achieve the maximum number of contact regions 40, the number of fluid paths in each of two sets may be equal. In order to even further increase the number of contact regions 40, a third set of fluid paths may be placed along a third axis. In one embodiment, multiple fluid paths may be arranged in parallel sets in three axes, such as a 10×10×10 fluid path array arranged in three orthogonal axes.

Fluid paths 20, 30 may be constructed of any material(s) that will not adversely affect or be affected by fluid flowing through fluid paths 20, 30. For example, fluid paths 20, 30 may be constructed of a material that is chemically inert in the presence of a fluid or fluids to be used within fluid paths 20, 30. Preferably, fluid paths 20, 30 are constructed of a single material that is cheap, durable and easy to work with, facilitating use outside a laboratory setting and making disposal cost effective. For example, fluid paths 20, 30 may be constructed of a polymeric material. It should be appreciated that the fluid paths may have some degree of reaction or other interaction with the fluid to be used therein, so long as the results do not interfere with the ability of the overall fluidic system to function as desired. For example, in some instances, organic solvents may be used in fluid paths constructed of polymeric materials that absorb and/or expand in their presence. This type of reaction may be acceptable depending on the application and degree of expansion.

Where fluid paths 20, 30 are constructed of a polymer, the polymer may be selected based on its compatibility with the fluids to be used, its durability and shelf life, its cost and its ease of use. Preferably, fluid paths 20, 30 are constructed from an elastomeric polymer such as polymers of the general classes of silicone polymers, epoxy polymers and acrylic polymers. A particularly preferred polymer is poly(dimethylsiloxane) ("PDMS"). PDMS is a relatively inexpensive, durable, elastomeric polymer. Because PDMS is stable, fluid paths 20, 30 and other portions of microfluidic systems constructed of PDMS may have a shelf life of 6 months or more. PDMS is transparent, facilitating direct observation of visually perceptible interactions. PDMS is also relatively easy to work with. It should be understood that while polymeric materials, and particularly PDMS, are preferred for the construction of fluid paths 20, 30, other materials, including conventional silicon chip materials, may be used to construct some or all portions of fluid paths 20, 30.

Convection controller 50 may be constructed in any manner and of any material(s) that allow convection controller 50 to inhibit the convection of fluid between fluid paths 20, 30 while allowing at least some diffusion between fluid paths 20, 30. For example, convection controller 50 may reduce or completely eliminate convection between fluid paths 20, 30 while permitting fluids within the paths, or materials contained within the fluids, to diffuse between fluid paths 20, 30.

Convection controller 50 may inhibit convection in any manner that reduces convection to a level required for a particular embodiment and need not necessarily eliminate convection. For example, convection controller 50 may provide a physical barrier, such as a wall or membrane preventing convection across contact region 40. Similarly, convection controller 50 may allow diffusion in any manner that allows a desired level of diffusion for a particular embodiment and need not be open to diffusion by all materials. For example, convection controller 50 may include pores or may be constructed of a material, such as a gel, through which material may diffuse. Combinations are also possible, for example, in some embodiments, gels could be included within pores. Convection controller 50 may be selective, allowing only certain sizes or types of materials to diffuse through it.

In one embodiment, convection controller 50 includes a membrane capable of inhibiting convection while allowing diffusion. Where convection controller 50 includes a membrane, the membrane may have sufficient strength and durability to inhibit convection to a desired level. For example, the membrane may be sufficiently strong to withstand a pressure difference across the membrane where such a pressure difference may be present in microfluidic system 10. The membrane may also have sufficient permeability to permit material to diffuse through it. For example, the membrane may be porous. Where the membrane is porous, the size of the pores may be large enough to allow diffusion of desired materials, but small enough to inhibit convection or diffusion of undesired materials. For example, in some embodiments, where it is desired to diffuse relatively large materials, such as cells, pores may be as large as the materials, or slightly larger. In other embodiments where it is desired to screen all but the smallest materials, pores may be as small as the smallest materials to be screened. For example, reverse osmosis, nanofiltration or ultrafiltration membranes may be used. In one embodiment, 0.1 micrometer pores have been demonstrated to allow a desired level of diffusion.

The effectiveness of using pores in a membrane to inhibit diffusion may be demonstrated as follows. The pressure drop for convection through a channel is proportional to the fourth power of the diameter of the channel. When a 100×100 $\mu m^2$ channel is replaced by $10^4$ membrane pores of the same length and with the cross-sectional area of 1 $\mu m^2$ each, at the same pressure gradient, the volumetric flow rate through individual pores is lower than the flow rate through the channel by a factor of $10^8$. The total convection through $10^4$ pores is therefore reduced by a factor of $10^4$. The diffusion is not affected by this replacement because the total cross-sectional area of the initial channel and of the pores is the same.

In some embodiments, it may be desired to screen particles based on properties other than size. For example, particles could be screened based on affinity or repulsion for a particular material, their partition coefficient, or their ability to form covalent bonds or otherwise chemically react with a particular material. In particular embodiments, the membrane may be charged to repel materials having a similar charge and attract materials having an opposite charge, may be hydrophobic or hydrophilic, or may have a bioaffinity for particular materials.

In some embodiments, convection controller 50 may trap materials from two streams. For example, where convection controller 50 is a gel or the like, materials and the products of the materials' interaction may be trapped in the gel. The fluid may then be removed from the streams and other fluids, such as a fluid containing a material capable of identifying the interaction product. Such a technique may be suitable for performing immunoprecipitations. Alternatively, the flow paths may be sealed for further interaction or archiving. As described in greater detail below, it is also possible to use this technique such that only one fluid path is required and the convection controller may be eliminated. For example, in some embodiments, two fluid paths may be placed, one after another, in communication with a gel that could have functioned as a convection controller or other immobilizer. In certain embodiments, gel convection controllers may be flowed into position between two fluid paths through a third fluid path positioned between them.

Figure 3:
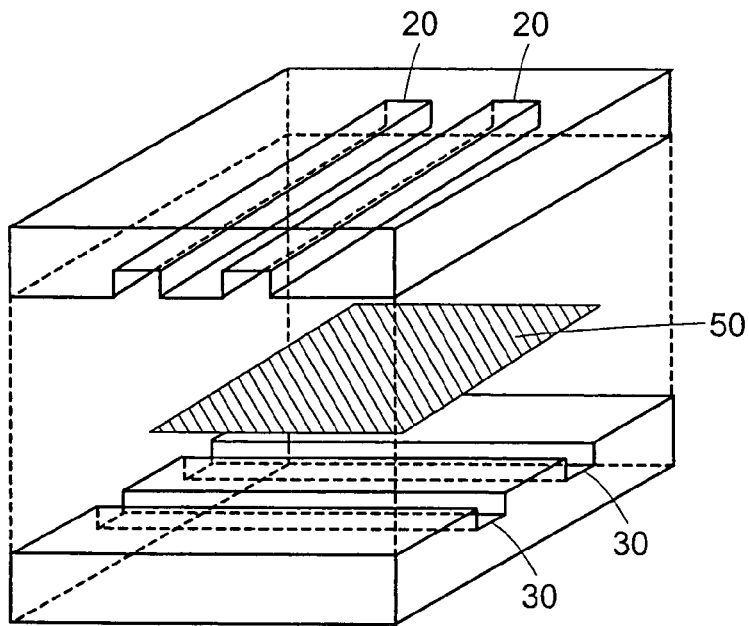
FIG. 3 is perspective, exploded view of a fluidic system according to another embodiment of the present invention.
Figure 4:
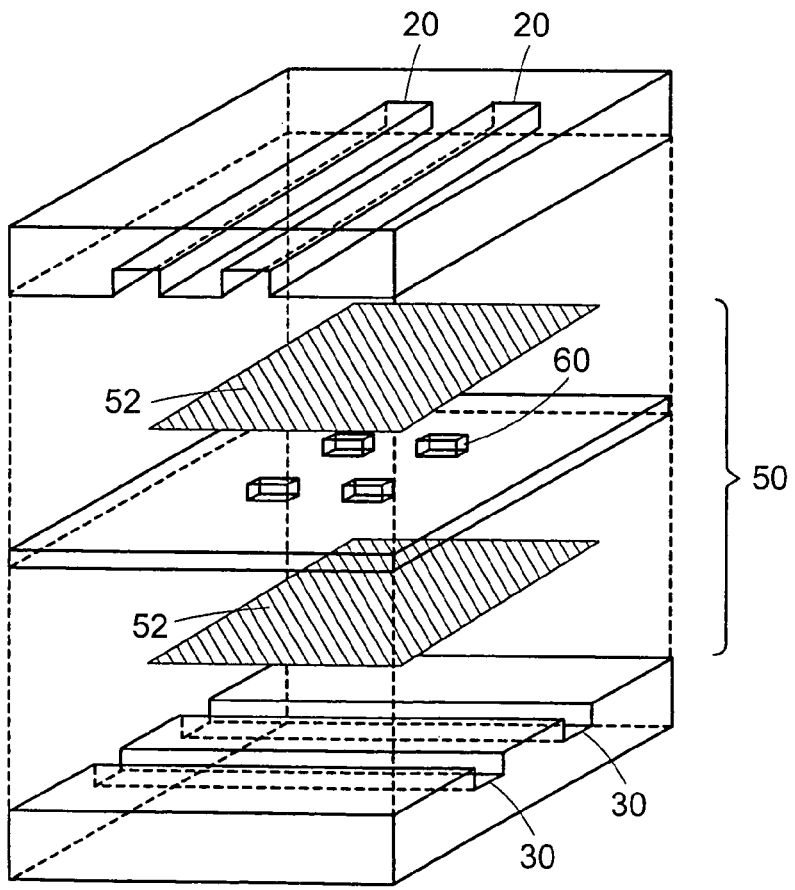
FIG. 4 is perspective, exploded view of a fluidic system according to another embodiment of the present invention.
Figure 5:
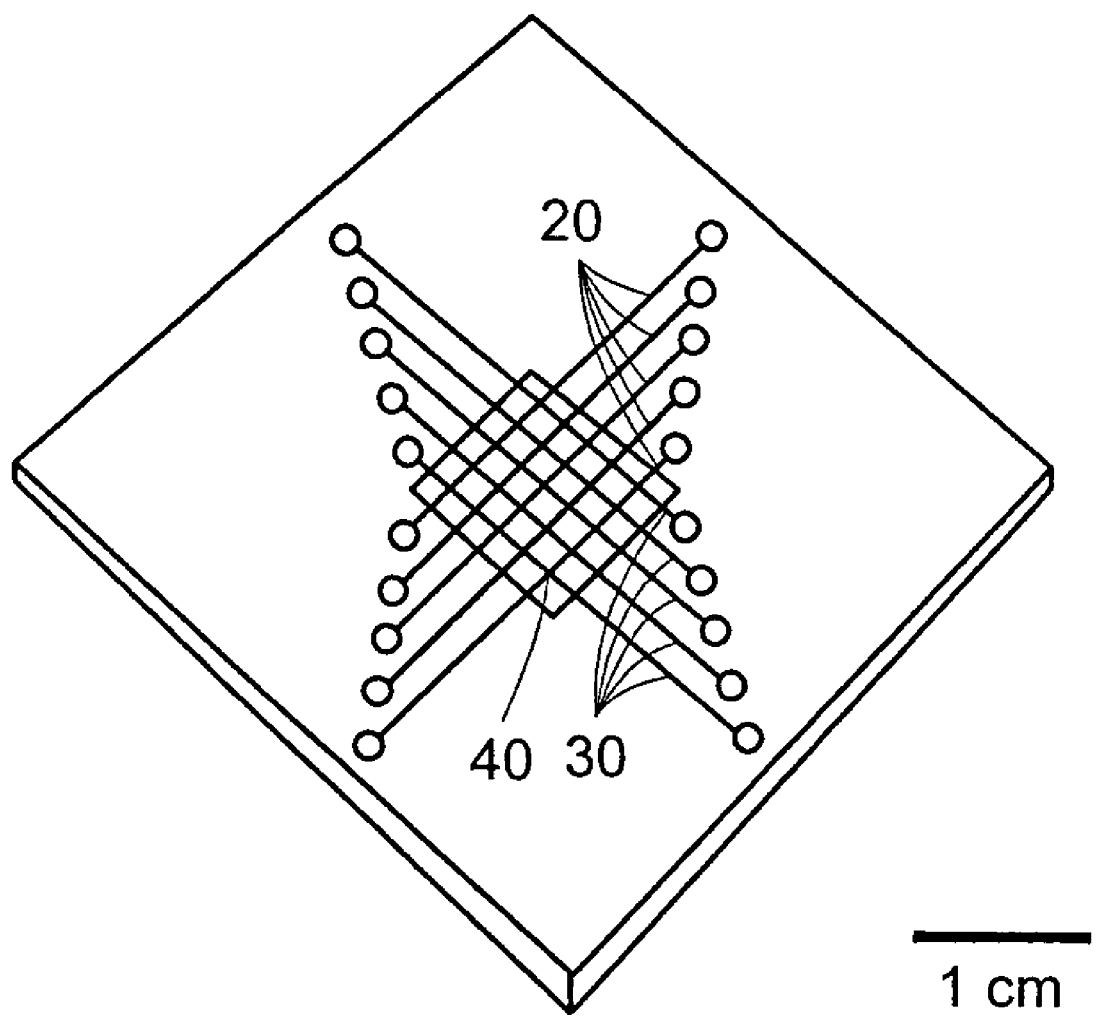
FIG. 5 is photocopy of a photograph of a fluidic system according to another embodiment of the present invention.

Convection controller 50 may be sized and configured in any manner that allows it to inhibit convection and permit diffusion, as desired. For example, convection controller 50 may be sized and configured to cover all of contact region 40. Where convection controller 50 is a membrane it may be generally planar and may be thick enough to provide desired strength and durability to the membrane and thin enough to allow sufficient diffusion. The thickness meeting this criteria may vary with the material from which the membrane is constructed. In some embodiments, a single convection controller 50 may be used at multiple contact regions 40. For example, convection controller 50 may be large enough to span several contact regions 40. In one embodiment, convection controller 50 is a membrane between two layers of material including fluid paths and covers all of the fluid contact regions 40 between the fluid paths, as illustrated in FIGS. 3 and 4.

Figure 2:
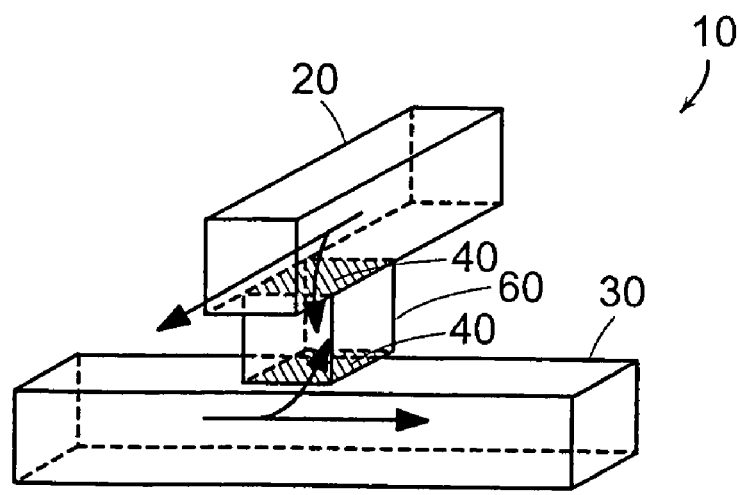
FIG. 2 is perspective, plan view of a fluidic system according to another embodiment of the present invention.

In some embodiments, convection controller 50 may be desired to provide a relatively large region for interaction between materials from fluid paths 20, 30. In addition to the possibility of increasing the size of contact region 40, for example by modifying the configuration of fluid paths 20, 30 as described previously, it may be desired to increase the depth of convection controller 50. For example, convection controller 50 may be made thicker to allow more material to be diffused within convection controller 50. In one embodiment, convection controller 50 may include internal voids wherein interactions between materials from fluid paths 20, 30 may occur and be observed. In another embodiment, convection controller 50 may include two or more surfaces, such as membranes, with a space or spaces between them. For example, as illustrated in FIGS. 2 and 4, two membranes 52 may enclose a space 60 such as a well or microwell between fluid paths 20, 30. Such an arrangement may be particularly desirable where the interaction to be observed between materials from each of flow paths 20, 30 would not be readily observable in a smaller volume.

Where convection controller 50 includes a space 60, such space 60 may be constructed in any manner and configuration that allows a desired volume to be generated or renders an interaction more readily observable. Typically, space 60 will have a length and width set to match contact region 40 and/or convection controller 50 and a depth set to provide the desired volume or to allow an interaction to be more readily observed. Increasing depth may make an interaction more observable by increasing the amount of the interaction that may be observed looking down the depth of space 60. For example, where an interaction produces luminescence or absorbance, the observed intensity of the luminescence or absorbance may be increased by increasing the depth of space 60. Depending on the embodiment, for a microfluidic system, space 60 may be less than 500 micrometers deep, less than 250 micrometers deep, less than 200 micrometers deep, or less than 100 micrometers deep. Space 60 may also vary in shape from contact region 40 and/or convection controller 50. For example, space 60 may include a well or microwell extending beyond contact region 40 and/or convection controller 50. Space 60 may be of any shape that provides the desired volume or renders an interaction more readily observable.

Convection controller 50 may be constructed from any material that sufficiently inhibits convection while allowing desired diffusion. A variety of materials are known in the art that inhibit convection and allow diffusion, in some cases such materials selectively exclude certain materials. For example, a variety of membranes, gels and filter materials are known that perform these functions. Many of these materials are polymeric materials, such as cellulose, cellulose acetate, polyamide, polyacrylamide, acrylonitrile, polyvinylidene, (sulfonated) polysulfone, nylon polypropylene, polyethylene, and polytetrafluoroethylene (PTFE). Another example of a suitable polymeric material that may be formed into a convection controller 50, such as a membrane, is polycarbonate. Polycarbonate is relatively inexpensive, durable and easy to work with and is capable of inhibiting convection while allowing diffusion through pores created within the material. A suitable polycarbonate membrane is available from Osmonics, Inc. of Minnetonka, Minn.

Microfluidic system 10 according to the present invention may be constructed using any method that will repeatably produce microfluidic system 10 having the desired structure and functionality. For example, microfluidic system 10, or portions of microfluidic system 10, may be constructed by conventional etching techniques known in the art. Preferably, microfluidic system 10 is constructed according to the methods described in "Rapid Prototyping of Microfluidic Systems in Poly(dimethylsiloxane)." *Anal. Chem.* 1998, 70, 4974-4984., "Fabrication of topologically complex three-dimensional microfluidic systems in PDMS by rapid prototyping", J. R. Anderson; D. T. Chiu; R. J. Jackman; O. Cherniavskaya; J. C. McDonald; H. K. Wu; S. H. Whitesides; G. M. Whitesides *Anal. Chem.* 2000, 72, 3158-3164., and a review "Fabrication of microfluidic systems in poly(dimethylsiloxane)", J. C. McDonald; D. C. Duffy; J. R. Anderson; D. T. Chiu; H. K. Wu; O. J. A. Schueller; G. M. Whitesides *Electrophoresis* 2000, 21, 27-40., which are hereby incorporated by reference in their entirety. The method described in this reference may be modified where required to accommodate the construction of convection controller 50. For example, convection controller 50 may be positioned between two layers of material containing fluid paths therein as part of aligning and joining the layers and bound to the material by conformal contact. Where a space 60 is desired within convection controller 50, space 60 may be constructed as a microwell in a layer and assembled as described in the above-referenced article.

Figure 6:
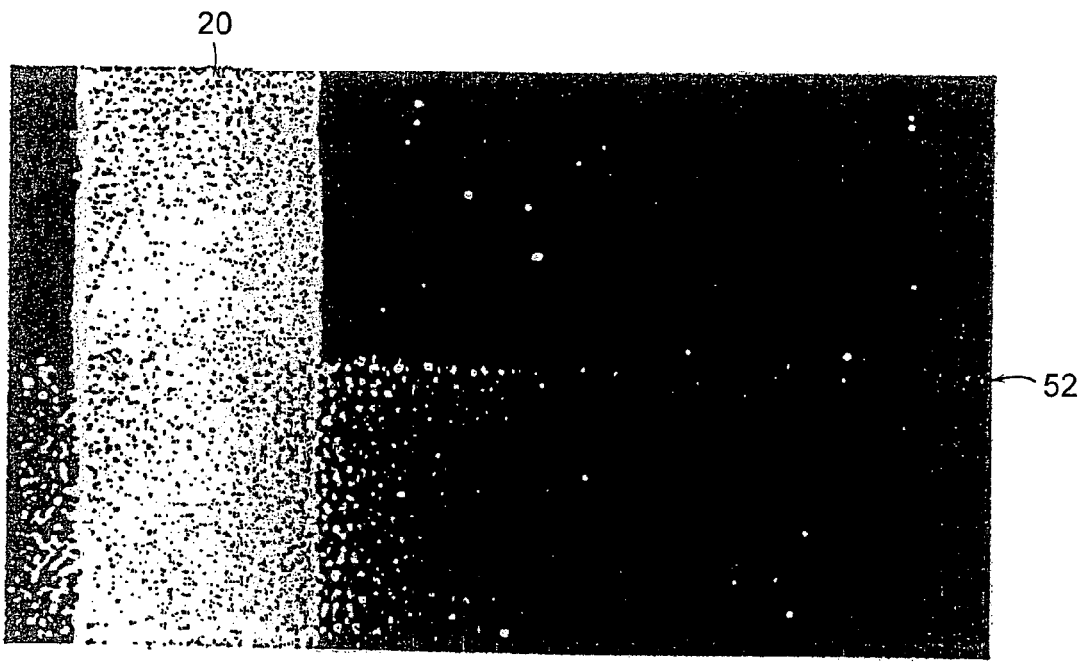
FIG. 6 is photocopy of a photomicrograph of one aspect of a fluidic system according to another embodiment of the present invention.
Figure 7:
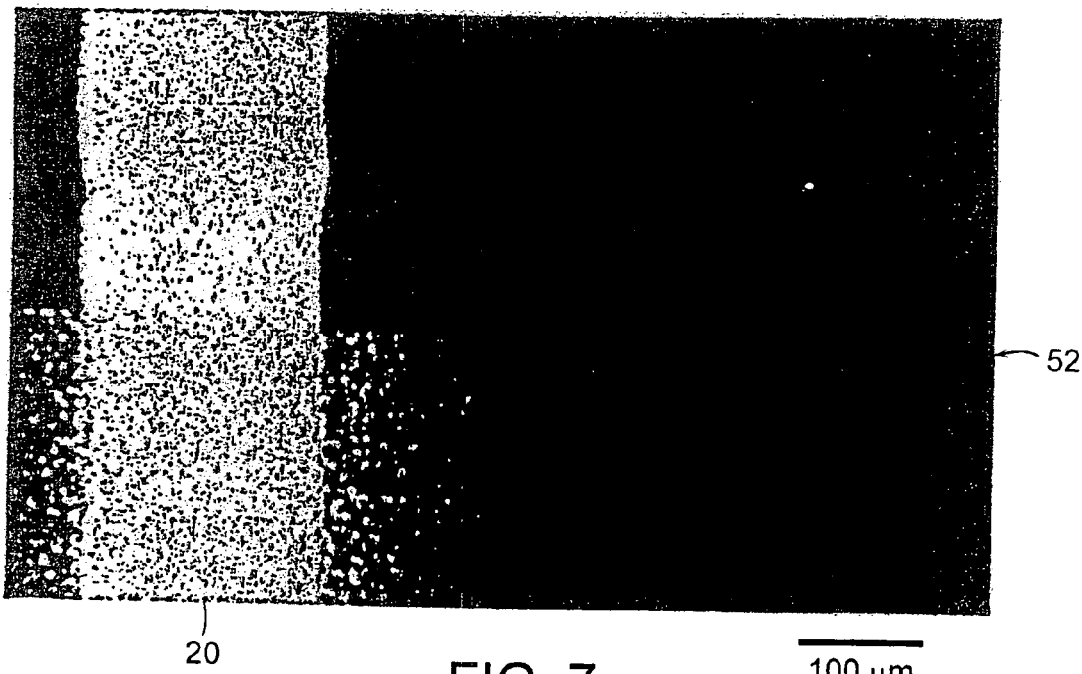
FIG. 7 is photocopy of a photomicrograph of another aspect of a fluidic system according to another embodiment of the present invention.

In some instances, it may be desired to treat the edges of convection controller 50 with prepolymer prior to assembly and sealing of the fluidic system, particularly where the material convection controller 50 is constructed from varies from the material fluid paths 20, 30 are constructed into. Upon curing, the prepolymer may seal any gaps at the edge of convection controller 50, inhibiting leakage. FIG. 6 illustrates the leakage that may occur at the edge 52 of a membrane convection controller 50 without prepolymer, as seen with fluorescent dye. By contrast, FIG. 7 illustrates the lack of leakage at the edge 52 of a membrane convection controller 50 when prepolymer is added as described above. Areas other than the edges where leaks may occur, such as between fluid paths and around contact points, may be treated similarly. Materials other than a prepolymer may also be used to seal leaks as described above. For example, any material capable of forming a fluid seal and compatible with the fluids, fluid paths, and convection controller may be used.

Any type of fluids or other flowable materials may be introduced into fluid flow paths 20, 30. For example, fluids may include solutions, suspensions, flowable gels, slurries, and the like. While the fluidic system of the present invention may be used to promote interaction of any substances, in a typical use a first fluid path 20, or set of fluid paths, will contain a material to be tested, while a second fluid path 30, or set of fluid paths, will contain an indicator material. Test materials may include any material that may be desired to be interacted with another material to produce some observable result. Indicators may include any material that may interact with a test material to produce an observable result, such as a color change, pH change, generation of luminescence, precipitation, change in index of refraction, light scattering, or the like. It also should be appreciated that the fluidic system of the present invention may be used for any interaction of materials and such reaction need not be a "test."

Interactions promoted or performed by the arrangement of the present invention need not be limited to chemical reactions. For example, interactions based on forces such as bioaffinity and hydrophobicity or hydrophilicity may be performed. Some such interactions may be relatively complex. For example, a first fluid, such as an aqueous phase may be placed in a first flow path 20, a second fluid, such as a surfactant, may be placed in space 60, and a third fluid, such as an oil, may be placed in second fluid path 30. The first fluid may be forced through pores in a first membrane, entering space 60 as drops and being coated with the second fluid. The drops may then be forced through pores in a second membrane into the third fluid, where they form vesicles. The size of the vesicles may be adjusted with the pore size and pressure.

Fluids may flow through fluid paths 20, 30 under constant flow conditions, varying flow conditions, or even conditions of no flow depending on the interaction to be performed. Where it is desired to flow a fluid through flow paths 20, 30, flow may be provided by pressure, such as by pumps, columns of water, and the like, by electroosmosis, or any other mechanism capable of generating a desired flow condition. As an alternate example, fluid may be supplied at a constant volumetric flow rate or a volumetric flow rate that varies over time in a predetermined or random manner, supplying fresh material to contact region 40 at a constant or variable rate. Such a system may allow a reaction or test to be run continuously, which is not possible in a tray system. Whatever the flow conditions, it is generally preferred to equalize the pressure across contact regions so that convection is minimized and the risk of damaging the convection controller is reduced. As discussed in U.S. Provisional Patent No. 60/286,476, which is hereby incorporated by reference in its entirety, the behavior of flows in microfluidic fluid paths is complex and depends, for example, on the aspect ratio of the fluid paths. At relatively high aspect ratios, where flow conditions are laminar and there is no pressure difference across the fluid contact region, no convection controller may be required as the only exchange between fluid paths may be diffusive. However, as these conditions may be difficult to attain, some sort of convection controller is preferred. In some embodiments, it may be desired to maintain a pressure gradient between fluid paths, such as where it is desired to provide a constant flow of material from one fluid path into the other. In such an instance, a small amount of convection through the convection controller is intended and desired.

Where it is desired not to flow a fluid through one or more of fluid paths 20, 30, an immobilizer may be used. The immobilizer may be any material that holds an interaction material in such a way that the material can interact with another interaction material and is not active in the context of the interaction. For example, the immobilizer may be an inert matrix. In one embodiment, the immobilizer is a thixotropic material, such as a flowable gel that is capable of being flowed at sufficient pressure, but that generally does not flow. In another embodiment, the immobilizer is a flowable material that is capable of being transformed into a non-flowable material by curing, setting, or the like. An example of such a material is agarose. Interaction materials, such as test materials and indicator materials may be introduced into the immobilizer (or part of it) and immobilized with it. In another embodiment, a fluid that is not an immobilizer but from which an interaction material may be deposited by precipitation, adsorption, absorption, covalent bonding or other chemical reaction, or the like may be used instead of an immobilizer to immobilize an interaction material. An example of such a material is a solution of a protein, from which the protein may be deposited via adsorption. While an immobilizer will typically remain within the fluid path, the fluid in this embodiment would typically be removed after the interaction material has deposited as desired. Immobilization may be reversible. For example, a thixotropic immobilizer may have sufficient pressure applied to induce flow. As another example, precipitation by adsorption, or the like, may be reversible. Immobilization may also be substantially irreversible. This may allow, for example, a patterned material to remain attached to a substrate while a material it interacted with is removed from the patterned material/and or substrate, potentially resulting in reusable devices.

In an embodiment where the immobilizer will be left in the fluid path, it may be preferred that the immobilizer allows diffusion through it so that interaction material immobilized therein may travel to the contact region. While the immobilizer would typically fill fluid path 20, 30, this is not required and as little of fluid path 20, 30 needs be filled as is required to contact the interaction material to the contact region. For example, at least 5% of the fluid path, at least 25% of the fluid path, or at least 50% of the fluid path at any given point may be filled with the immobilizer. In some embodiments, both fluid paths 20, 30 may contain an immobilizer.

It should be appreciated that once a material is immobilized in a fluid path, the fluid path can be removed from the material, or opened on at least one side. For example, where a fluid path has three sides formed of a monolith and one side that is a separate material, (a substrate), fluid may be immobilized therein and the monolith removed, leaving a pattern of immobilized material on the substrate.

The use of immobilization may also allow use of only a single fluid path, or set of fluid paths which do not cross or otherwise make contact with one another at contact points. For example, instead of immobilizing a material of interest in a fluid path and allowing it to interact at a contact point through a convection controller, the material can be immobilized on, or in, a substrate. The substrate may then be used to form one side of a fluid path and fluid may be flowed across it to allow the desired interaction. The material to be immobilized may be patterned on to the substrate such that it only comes into contact with, and is able to interact with, a fluid flowing in the fluid path in certain locations. For example, the material may be patterned in a way that provides contact points similar to those provided at convection inhibitors in crossing fluid paths.

Figure 17:
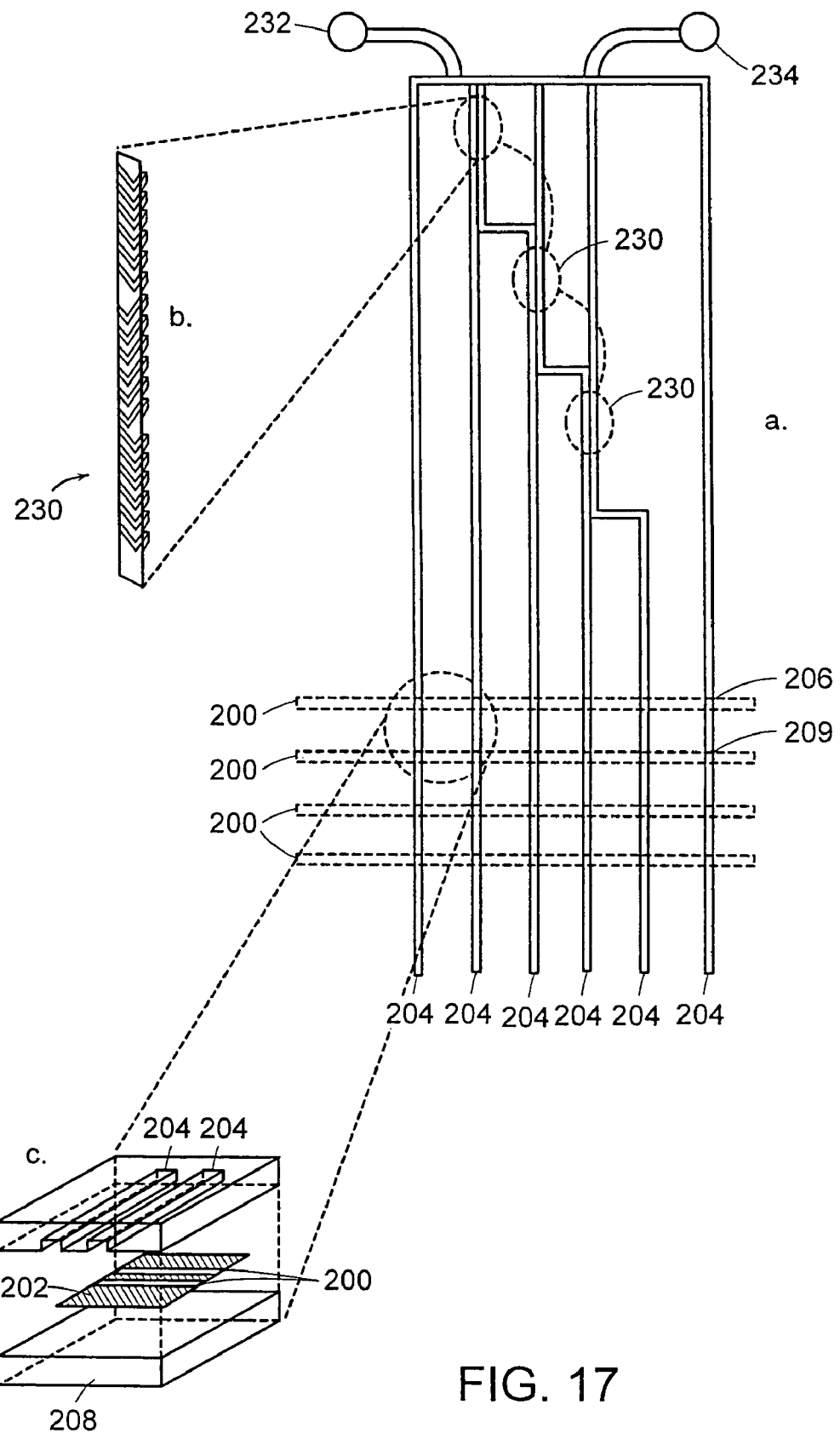
FIG. 17 section (a) is a top, plan view of a fluidic system according to another embodiment of the present invention, section (b) is an enlarged, plan view of a portion the embodiment of section (a), and section (c) is an enlarged, exploded view of a portion the embodiment of section (a)
Figure 19:
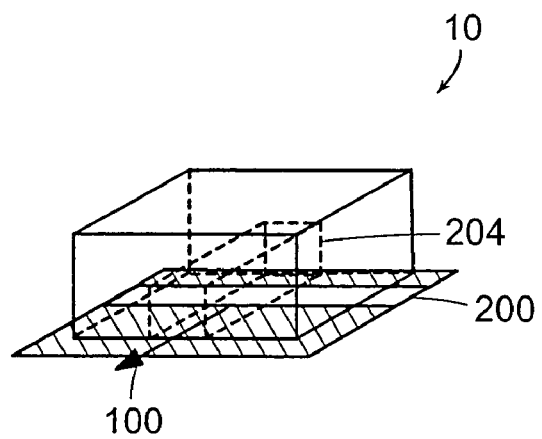
FIG. 19 is a perspective view of a fluidic system according to another embodiment of the present invention.

One embodiment where only a single fluid path, or set of fluid paths which do not cross or otherwise make contact with one another, are used is illustrated in FIGS. 17 (set of fluid paths) and 19 (single fluid path). In the embodiment illustrated in FIG. 19, which is a microfluidic system 10, a series of parallel lines of interaction material 200 are patterned onto a substrate 202 with a series of parallel fluid paths 204 crossing them at a right angles, creating multiple interaction sites 206. As is the case with crossing fluid paths, this arrangement allows the number of interaction sites to increase geometrically with a linear increase in the number of fluid paths and lines of interaction material. Accordingly, it will be recognized that this embodiment may be used in many of the same testing and other interaction applications disclosed previously.

Where a substrate 202 is used, it may be any material that is able to have a pattern formed thereon, or therein, of the desired interaction material. For example, the substrate may be a membrane or may be a thicker piece of material. In some embodiments, the substrate may be constructed from a material that would be suitable for use as a convection controller. Where the interaction material is a hydrophilic or hydrophobic material, such as a protein, a suitably hydrophilic or hydrophobic material upon which it may be adsorbed, such as polycarbonate, may be used as substrate 202. Where interaction materials may be damaged if the membrane dries out after patterning, the substrate may be able to at least temporarily maintain moisture.

Where the substrate is formed as a membrane, it may be desired to support the substrate on a support 208, for example as illustrated in FIG. 17, section c. Support 208 may be constructed in many manner and using any materials that provide sufficient support to substrate 202. For example, support 208 may be constructed of the same material from which the fluid paths are formed and may be of sufficient size and shape to support the relevant areas of the substrate.

Figure 18:
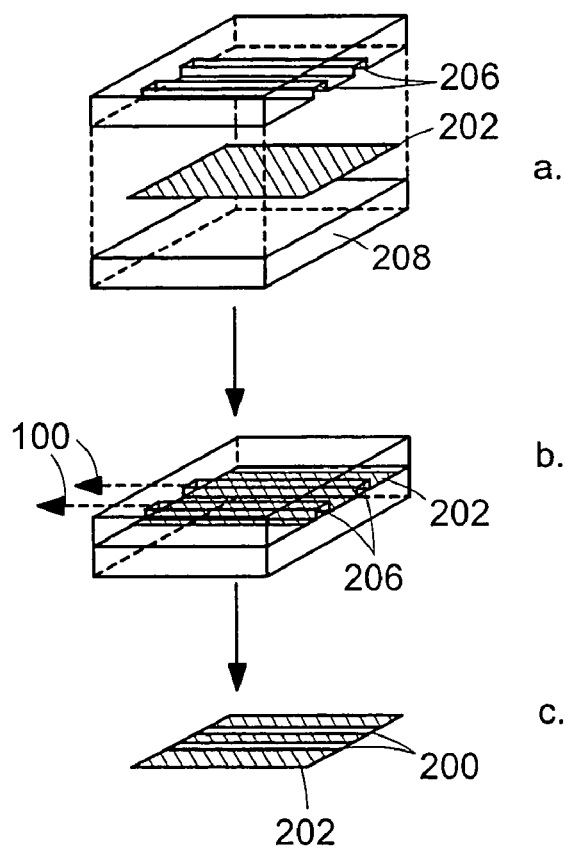
FIG. 18 section (a) is an exploded view of a fluidic system according to another embodiment of the present invention, section (b) is a perspective view of another aspect of the embodiment of section (a), and section (c) is a perspective view of another aspect of the embodiment of section (a)

Interaction materials may be patterned onto a substrate in any manner that allows them to applied in the desired pattern and in a manner that makes them accessible for desired interactions. For example, the method may be capable of laying out interaction materials in a pattern to create desired contact points between the interaction materials and the fluid path, and the patterned interaction materials may be accessible to interaction materials in the fluid paths. One suitable method for patterning interaction materials is illustrated in FIG. 18. In this method, one or more fluid paths 206 may be placed in fluid contact with substrate 202 and fluid including interaction material therein may be flowed into the fluid path. The interaction material may be allowed to deposit on the substrate, and the fluid removed to immobilize the interaction material, as described previously. The shape of the fluid path or paths may dictate the pattern, both in terms of shape and size, of interaction fluid formed on the substrate. Typically, the shape and size of the interaction material will match the size and shape of the open side of the fluid path from which it is patterned. Additionally, fluid contact need only be made where it is desired to pattern material, and this can be used to further control the patterning of the interaction material. For example, the fluid path may be open to the substrate at intervals, creating spots, dotted lines, or many other patterns, depending on the size and shape of the openings. After the pattern is formed, the fluid paths may be removed from the substrate. Where the patterned interaction material may be relatively sensitive, care may be take to remove the fluid paths such that the interaction material is not substantially damaged, i.e., the interaction fluid will function as desired in a particular embodiment. Additional method of patterning materials on substrates that may be suitable for embodiments of the present invention may be found in PCT Publication No. WO 01/89787, which is hereby incorporated by reference herein in its entirety.

In some embodiments using more than one fluid path may allow different interaction materials to be patterned onto the substrate. The flow paths may be in contact with the substrate at the same time, or different times. In some embodiments, it be desired to form patterns of different interaction materials that overlap. It should be appreciated that embodiments of the method of forming a pattern of material on a substrate of the present invention is not limited to interaction materials and may be used for other purposes, such as the formation of markings, and the like.

In the example embodiment of FIG. 18, two fluid paths 206 are used to pattern two stripes of interaction material 200 on a membrane substrate 202. As shown in FIG. 17, section a, the fluid paths are placed in contact with the substrate and the substrate if supported by a support 208. Fluid including the desired interaction materials (e.g., an aqueous solution of protein) is flowed through the fluid paths as illustrated by flow indicators 100 in FIG. 17, section b. The interaction material is deposited on the substrate and the flow paths and support are removed, leaving a substrate patterned with two strips, each including a different interaction material, as illustrated by FIG. 17, section c.

Where the reaction to be performed is a test, the results of interactions between fluids in the fluid paths may be observable in any manner. For example, they may be observable visually with the naked eye or with instrumentation, or may be observable by other means, such as through changes in temperature, pH, or the like. Where the reaction is not observable with the naked eye, an instrument, such as a pH meter, optical detection system or thermocouple may be present within or outside the fluid system to make the observation. Even where the reaction is visible to the eye, it may be desired to use an instrument, for example to automate measurement or to measure intensity of fluorescence or absorbance.

In some embodiments, the present invention may use the flow conditions within the fluid paths to further increase the amount of interactions that may be performed. For example, where fluid flows under highly laminar conditions, as is often the case in microfluidic systems, fluid does not mix as it flows, except by diffusion. Accordingly, it is possible to introduce two or more fluids into a fluid path such that they flow in parallel. Such fluid paths containing multiple fluids may effectively act as multiple fluid paths. For example, as illustrated in FIG. 16, three fluids, designated 1, 2 and 3 may flow in fluid path 20 and three fluids designated A, B and C may be flow in fluid path 30. At contact region 50, nine different interactions may occur. Techniques suitable for flowing fluids in parallel and the related equipment is described in U.S. Provisional Patent No. 60/286,476, which is hereby incorporated by reference in its entirety.

In certain types of testing, such as immunoassays, it may be desirable to serially dilute test material. One method of serial dilution that may be useful in certain embodiments of the present invention is disclosed PCT Publication No. WO 02/22264, which is hereby incorporated herein by reference in its entirety. Dilution may also be performed according to a method of gradient generation of the present invention. In the method of the present invention, a fluid to be diluted to introduced into a first inlet of a microfluidic device and a dilutant is introduced into a second inlet of the device. The fluid to be diluted then may be split. A first portion of the fluid may pass undiluted into a first flow path, while a second portion of the fluid passes into a second flow path that is also connected to, and receives dilutant from, the second inlet. Accordingly, the fluid may be diluted. A portion of the diluted material may then be passed via a connecting path to a third fluid path while the remainder continues through the second fluid path. The third fluid path may also be connected to the second inlet and the already diluted material may be further diluted. This process may be repeated to achieve as many levels of dilution as desired. This method of dilution allows simultaneous dilution of a material in multiple streams over a wide range of preselected dilution ratios. In certain testing applications, this may allow a relevant dynamic range of dilution between saturation and no response/background to be quickly identified so that quantitative results beyond simple positive/negative testing are achievable. This method also offers significant time savings over manual dilution techniques.

The level of dilution in each step of the method of gradient generation of the present invention may be controlled. For example, the amount of dilution may be controlled by controlling the relative amounts of the fluid and dilutant introduced into each fluid path. Where more dilution is desired, relatively greater amounts of dilutant may be added to each fluid path and, where less dilution is desired, relatively lesser amounts of dilutant may be added to each fluid path. In certain embodiments, it is desired to decrease the concentration of the fluid (or materials therein) by 50%. In such embodiments, the amount of fluid and dilutant added to each fluid path may be evenly matched. In other embodiments, 10%, 25%, 75%, or 90% reductions in concentration may be desired.

The amount of fluid and dilutant added to each fluid path may be controlled in any manner that creates the desired level of dilution as accurately and precisely as required. Various factors may influence the flow rate of fluid and dilutant, and thus, the relative amount of each that is supplied. For example, the feed pressure, the viscosity, the flow conditions, and other factors may all be related to the flow rate of the fluid and the dilutant. Where dilution is to take place in a microfluidic system, the flow conditions in such systems may be taken in to account. For example such systems typically are characterized by highly laminar flow conditions. Where desired, inlet pressure may be controlled, for example, by a pumping system or gravity feed. Flow conditions within the fluid paths may be controlled by controlling the physical configuration, such as size and shape, of the fluid paths. Where it is desired to feed even amounts of fluid and dilutant to fluid paths, the fluid paths from the inlets to the point at which the fluids meet may be as substantially evenly matched as is practical in a given embodiment.

Where it is desired to have even mixing of the fluid and dilutant, a mixing region downstream of the meeting place of the fluid may be desired. A mixing region may be particularly desirable where the fluids are under laminar flow conditions, such as in common in microfluidic systems, and would otherwise mix only by diffusion. In other embodiments, mixing by diffusion may be acceptable, and the length of the fluid path may be selected to allow more or less diffusion. Methods of mixing by diffusion are provided in International Patent Application PCT WO02/22264 and in U.S. patent application Ser. No. 09/954,710, titled "Method and Apparatus for Gradient Generation," and filed Sep. 18, 2001, both of which are hereby incorporated by reference herein in their entirety. Mixing regions will typically include a mixer able to create flow conditions, such as turbulent flow, which promote mixing. Mixers may be active or static. Static mixers are generally preferred as no means of energizing them are required and there are no moving parts to wear out or breakdown. One example of a static mixer suitable for use in a fluidic system of the present invention, and, in particular, a microfluidic system of the present invention is a chaotic advective mixer (CAM)—a microscale surface structure that mixes small volumes of liquids relatively efficiently. CAMs are described in PCT Application No. US 02/23462 filed Jul. 24, 2002 and titled "Laminar Mixing Apparatus and Methods", which is hereby incorporated by reference herein in its entirety.

Figure 20:
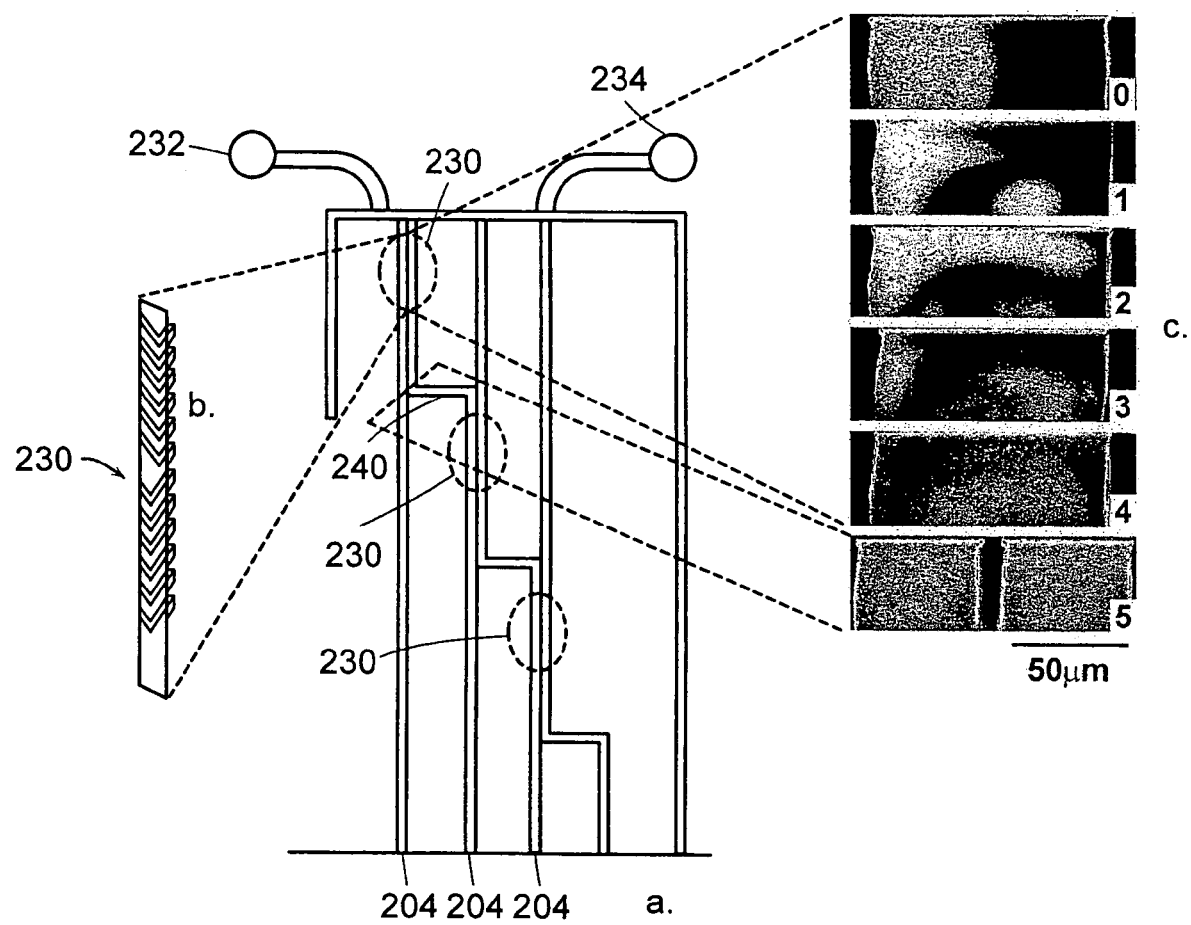
FIG. 20 section (a) is a top, plan view of a fluidic system according to another embodiment of the present invention, section (b) is an enlarged, plan view of a portion the embodiment of section (a), and section (c), parts 0-5, are photocopies of photomicrographs of a portion the embodiment of section (a) in operation according to one embodiment of the present invention.

One embodiment of an apparatus for gradient generation is illustrated in FIGS. 17 and 20. In the illustrated embodiment, a gradient generation apparatus includes (from left to right) first, second, and third fluid paths 204 each having a cross-section of less than one millimeter. Second and third fluid paths 204 each comprising a mixing region 230. A first inlet 232 is fluidly connected to first and second fluid paths 204 and a second inlet is fluidly connected to the second and third fluid paths 204. A first connecting path 240 is fluidly connected to second fluid path 204 downstream of its mixing region 230 and fluidly connected to third fluid path 204 upstream of its mixing region 230. Fluid paths and inlets in this embodiment of the present invention may be constructed as described above for other embodiments of the invention. The embodiment illustrated in FIGS. 17 and 20 has been constructed such that the fluid will be diluted 50% at each mixing stage be supplying equal amounts of fluid and dilutant to each fluid path where mixing takes place.

Fluid paths 204 may supply fluid to any location where the gradient generator is to be used. FIG. 17 illustrates one possible use for the gradient generation apparatus of the present invention, where the gradient generation apparatus provides fluid to a microfluidic system comprising interaction material 200 patterned onto a substrate, as described previously herein. It should be appreciated that other microfluidic systems, including other embodiments of the present invention using crossing fluid paths may also be fed fluid from the gradient generation apparatus of the present invention.

Other uses and configurations of the present invention are envisioned. For example, the convection controller might contain multiple membranes separated by a series of spaces. If a flow gradient were created and if the membranes had smaller pores with each successive membrane in the direction of the gradient, materials could be separated by size. Such a system might be used to separate proteins where very small samples are involved.

As an alternate example, a system according to the present invention may allow layers of material containing fluid proteins to be removed or detached from layers of material containing one or more convection controllers.

In one aspect, the invention provides a platform for performing chemical or biological titrations, or otherwise combining different fluids together in various ratios. Chemical or biochemical reactions within fluids or between fluids may be evaluated, monitored or measured. Titrations typically involve reacting a reagent (titrant) with an analyte (sample). The titration reaches an end point when all, or substantially all, of the analyte has reacted with reagent. Traditionally, when performing a titration, the state of the reaction is monitored while reagent is added and addition of reagent is stopped when an end point is reached. Titrations may be automated. In continuous flow titrations, the amount of reagent added to a stream of analyte is increased over time so that the ratio of reagent to analyte exposed to a detector at the end of the stream increases over time. Where "reagent," "titrant," or "sample" or "analyte" is used in describing the embodiment illustrated in FIGS. 27 and 28, it is to be understood that any fluid or fluids may be used and that any component or species or combination of components or species in the fluid may be determined, detected or measured.

Figure 27:
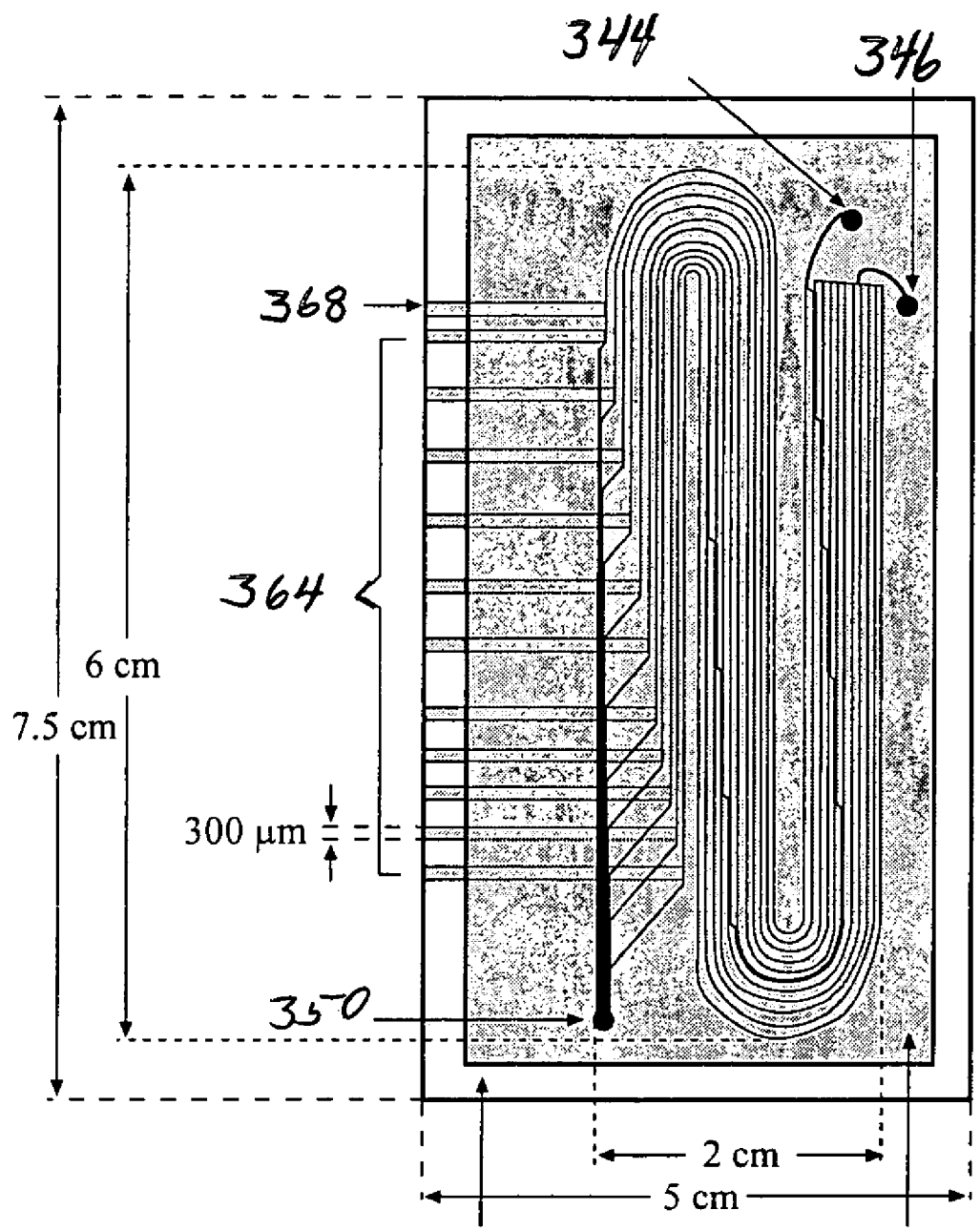
FIG. 27 is a plan view of a fluidic device of the present invention.
Figure 28:
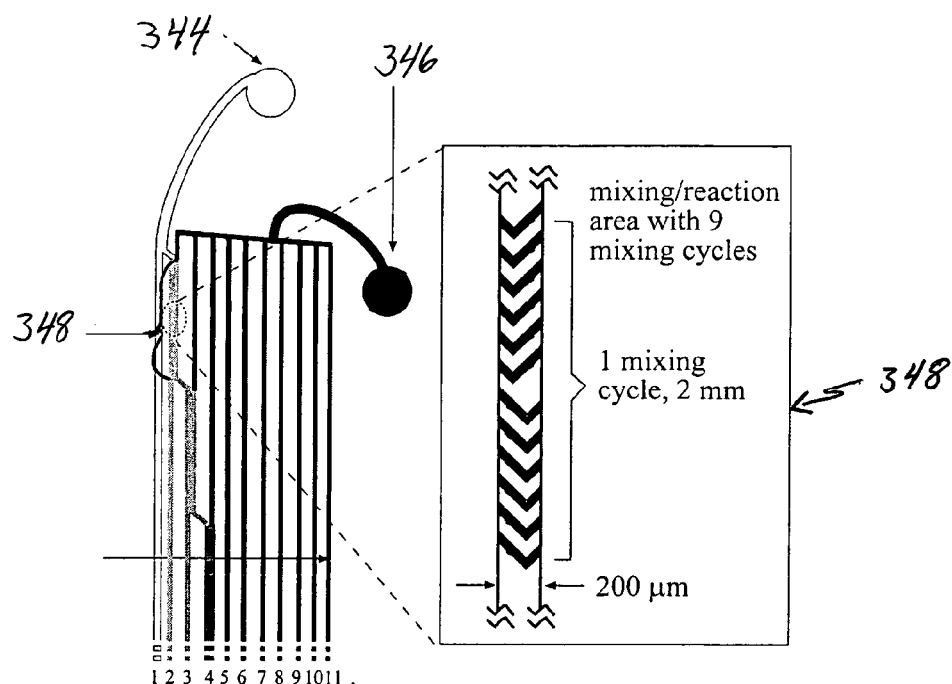
FIG. 28 section (a) is a plan view of a device of the present invention, including an enlarged section of the device, and section (b) provides a perspective view of the same device.
Figure 28:
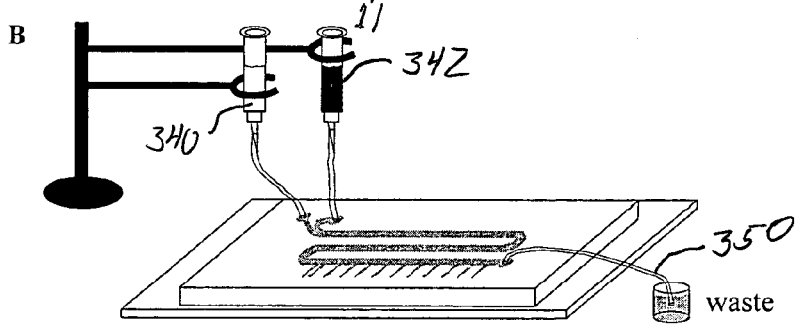

One embodiment of the invention is illustrated in FIGS. 27 and 28. Depicted in each figure is a fluidic device that can be used to titrate a sample and a reagent. The device includes eleven essentially parallel microchannels that are formed in a serpentine pattern on a substrate. The eleven microchannels are fed by two inlets 344 and 346 that receive fluid from reservoirs 340 and 342. Fluid entering inlet 344 is directed to the first channel on the left. Fluid entering via inlet 346 is distributed to an upper portion of each of the remaining 10 channels. The first channel joins the second channel at region 348, which may be a mixing region. If flow rates of the two fluids are about equal and if the volume of the combined channels is equal to about twice the volume of each of the individual channels, then the combined fluid in the mixing region may be about 50% by volume of each of the original fluids. Of course, if the fluids or components in the fluids interact or change, then the composition of the combined fluids may be different than one or both of the original two fluids. The process may be repeated downstream where the 50/50 fluid from the second channel is combined with pure fluid in the third channel (from inlet 346). If the same ratios are used in this mixing region, then the resulting fluid will be about 25/75 of first fluid to second fluid. These ratios can, of course, vary depending upon a number of factors, for example, viscosity, specific gravity, backpressure, surface tension and channel geometry. Mixing may be aided by a mixing device such as a CAM shown in the enlarged portion of FIG. 28.

The end of each of the channels may be joined at point 350 which may be a waste stream or other stream composed of the combined fluids. Prior to joining, each channel may pass an area proximate to a sensor such as one of electrodes 364 or reference electrode 368. Therefore, each dilution of the two fluids (in 10 of the channels) may be analyzed by a different detector. Each sensor may be monitored separately, or the sensors may be monitored in parallel. In this manner, fluids comprising multiple different pre-determined solutions may be analyzed in parallel. For example, if each successive channel is diluted 50/50 with pure fluid from inlet 346, the channels may include, for instance, fluids having ratios of the second fluid to the first fluid of 1:1, 3:1, 8:1, 16:1, 32:1, 64:1, 128:1, etc. The components of each stream may react concurrently and may be analyzed concurrently. Using the methods described herein, devices may be designed with any number of different dilution ratios. The dilutions need not be linear and may be, for example, logarithmic or second order functions.

In one embodiment, a titration platform may be provided that includes one or more sensors. A sensor is a device that can detect a physical or chemical condition of a fluid. Examples of sensors include, for example, electrodes, ion-specific electrodes, photocells, spectrometers, chips, electrochemical detectors, light scattering detectors, fluorescence detectors, sulfur detectors, nitrogen detectors, BOD detectors, gas sensors, UV detectors, radioactivity detectors, immunosensors, diode arrays, conductivity detectors, refractive index detectors, polarity detectors, etc. Sensors may be either qualitative or quantitative. Each sensor may be associated with a channel, such as a microchannel in a microfluidic device. Using methods and structures described herein, different ratios of reagent to analyte may be flowed through different channels. For example, a microfluidic device may include 10 microchannels, and each successive microchannel may include a fluid having a reagent to analyte ratio that is greater than that of a fluid in a previous microchannel. For example, the ratio of reagent to analyte may increase by a specific factor, such as, for example, 2, 4 or 10, with each successive microchannel. Titrations may be run with any amount of fluid and in some embodiments only small amounts of sample are required. For example, in some embodiments, less than 1 mL, less than 100 µL, or less than 10 µL of sample and/or titrant can be used. Fluids exhibiting different ratios may flow through a sensor placed in position so as to be able to determine a characteristic of a fluid in one or more channels, e.g., at a point in, near, or aligned with each microchannel. The sensor may be placed at or near a point along the channel where reagent and analyte have been allowed to interact to an extent adequate to allow substantially complete reaction between the two. For example, a sensor may be placed downstream of a mixing region.

Many types of titrations can be carried out in accordance with the invention. For example, titrations may be based on precipitation (Ag(I) with $Cl^-$, $Br^-$, $I^-$, $SCN^-$, or $S^{2-}$), complex formation (Ag(I) forming complexes with ligands such as $CN^-$ or $S_2O_3^{2-}$), redox (Fe(II)/Fe(III) with Ce(III)/Ce(IV)), and acid-base. The course of the titration can be followed using many types of sensors. Some examples of techniques that can be used with titrations are potentiometry, amperometry, spectrophotometry, turbidometry, fluorimetry, and calorimetry.

An end point for the titration may be determined, for example, by monitoring the sensors and recording which sensor is associated with a microchannel that provides the lowest ratio of reagent to analyte and that indicates all of the reagent has been reacted. Sensors may also measure excess reagent, excess sample, or both. In similar embodiments, different ratios of reagent to analyte can be used to assure that at least one of the sensors will be measuring in a "preferred" range. For example, a preferred range may be a range where response is linear or the titration has a low limit of detection or standard deviation.

In another embodiment, measurement of reaction conditions may be measured in parallel using multiple sensors. Parallel readings may result, for example, in significant time savings. A series of dilutions in various channels may be used to provide different reagent to analyte ratios, but the varying ratio fluids may be delivered concurrently, rather than sequentially over time. Thus, one test sample may be analyzed at any number of reagent to analyte ratios and may be analyzed in parallel. A microprocessor may be used to record data from multiple sensors. The ratios may be pre-determined and may be controlled, for example, by the geometry of the device or by flow rates of the sample, titrant, or both. Such parallel measurements may be useful, for example, in monitoring chemical processes in real time. Continuous data for any number of reagent to analyte ratios may be obtained for a single sample and may be obtained at any point in time. When used in a microfluidic device, sample use rates for continuous monitoring may be small, for example, less than one microliter of sample per second or less than 10 µL per titration. Microfluidic devices may also provide for fast reaction times, minimizing the time from when a sample is introduced to the system to the time when a titration result is realized.

Sample fluids and titrating fluids may be flowed through a microfluidic system using any of the methods that are known to those skilled in the art or are described herein. In one embodiment, a sample, a titrant, or both, may be flowed through a microfluidic device without a pump. For example, gravity may be used to push fluids through the device. Flow pressure may be provided by raising sample and/or titrant reservoirs above a microfluidic device and allowing the respective fluids to flow through tubing to inlets of the device. Flow rates may be adjusted by varying the height of the reservoirs.

EXAMPLES

Example 1

Figure 8:
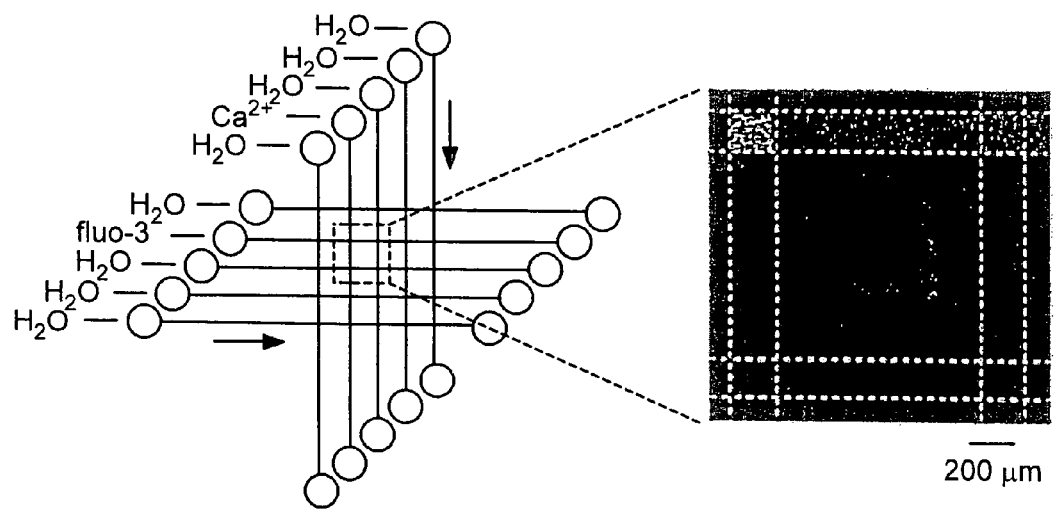
FIG. 8 is a top, plan view of a fluidic system according to another embodiment of the present invention including a photocopy of a photomicrograph of a portion of such a fluidic system.
Figure 9:
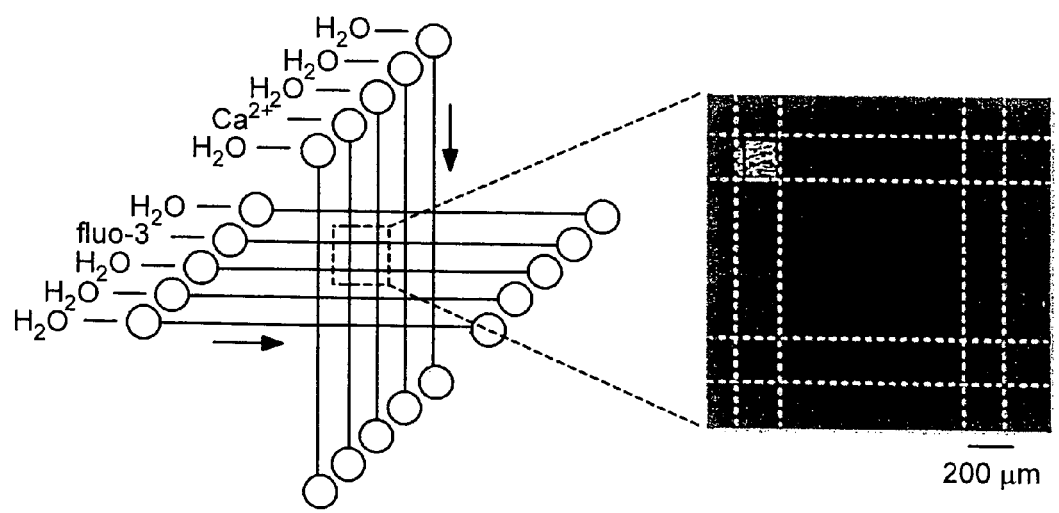
FIG. 9 is a top, plan view of a fluidic system according to another embodiment of the present invention including a photocopy of a photomicrograph of a portion of such a fluidic system.

To demonstrate that individual contact regions in an array of contact regions may be addressed independently, calcium (II) ions were detected in a fluid path of one layer of a 5×5 array using a fluorescent probe, fluo-3 (Molecular Probes, Eugene, Oreg.), in a fluid path in the other layer; the other eight fluid paths were filled with water, as illustrated in FIGS. 8 and 9. The fluid paths were 200 microns wide. Fluorescence was observed only at the contact regions of the fluid paths containing calcium(II) ions and fluo-3. FIG. 8 illustrates that where the convection controller comprised a single polycarbonate membrane 10 micrometers thick with 0.1 micrometer vertical through-holes there was weak flow through the contact region due to unequal pressures and diffusion that led to leakage of fluorescent calcium(II)/fluo-3 complex into the fluid path. However, because the signal is stronger at the contact region, convection through the membrane is demonstrated to be much lower than diffusion (otherwise convection would have flushed the florescent product out of the membrane at the contact region). It takes 0.1 second (s) for a small molecule with the diffusion constant $D \cong 10^{-5}$ cm$^2$/s to diffuse 10 µm (the thickness of the membrane). Convection through the membrane was therefore much lower than 0.01 cm/s.

Leakage was not observed in a system where the convection controller included two membranes with a 200 micrometer thick microwell between them, resulting in a $8 \times 10^{-12}$ m$^3$ space. Because it takes 10 s for a small molecule to diffuse 200 µm (the size of the microwell), the convective flow rate through the microwell may be deduced to be much lower than 0.002 cm/s. The lack of leakage in this system is illustrated in FIG. 9.

The fluidic systems of both FIGS. 8 and 9 were designed to balance fluid pressure, and thus to prevent convection, across each contact region of the fluid paths. The distances from any contact region to the inlet was designed to be equal in the two layers of fluid paths, as was the distance from the contact region to the outlets. Assuming that all fluid paths were of uniform dimensions, and the pressure was equal at all inlets and at all outlets, this design ensured that there was no pressure differential across the contact regions. However, variations in the pressures, and imperfections in the dimensions of the fluid paths, as well as diffusion of calcium ions through the membrane, were sufficient to generate observable flow through the convection controller.

This experiment demonstrates that specific contact regions were addressable in fluidic systems having convection controllers comprising both a single membrane and a pair of membranes separated by a space.

Example 2

Figure 10:
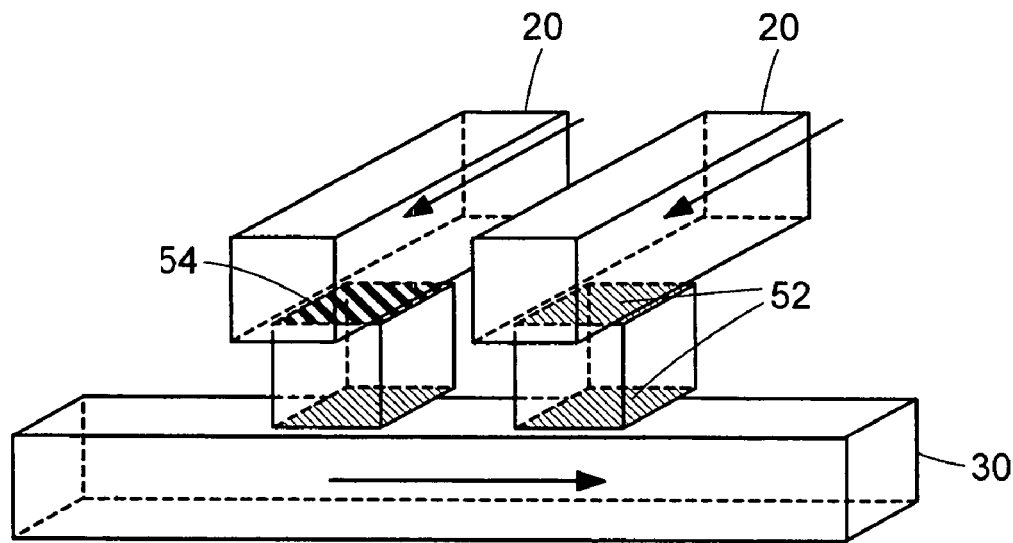
FIG. 10 is a perspective, plan view of a fluidic system according to another embodiment of the present invention.
Figure 11:
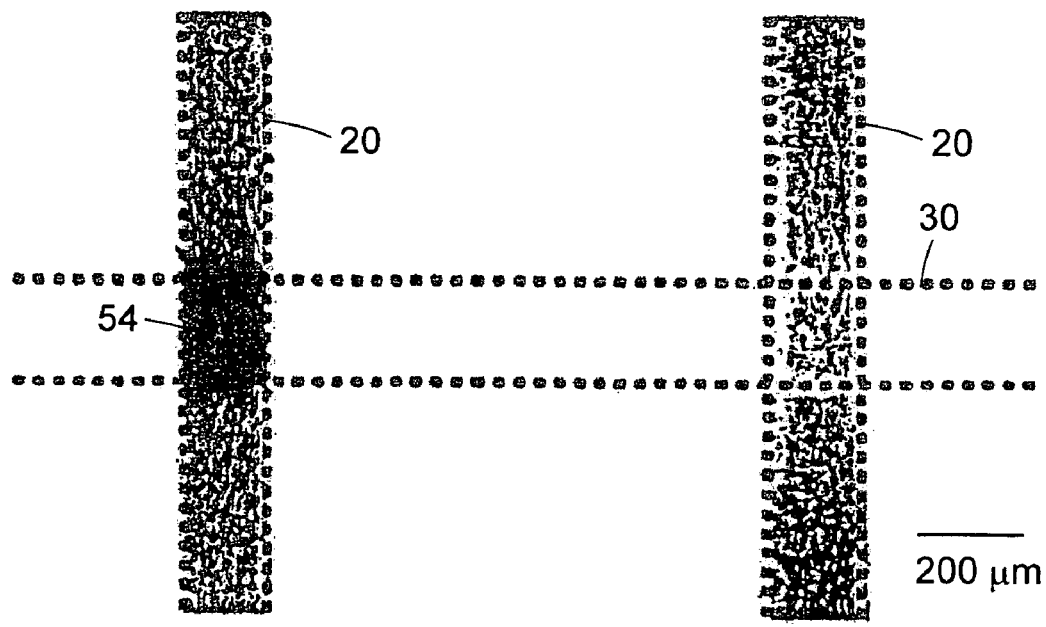
FIG. 11 is a photocopy of a photomicrograph of the embodiment of FIG. 10.
Figure 12:
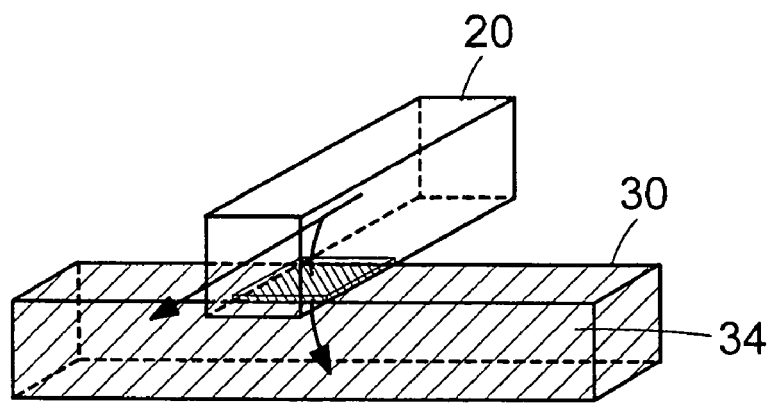
FIG. 12 is a perspective, plan view of a fluidic system according to another embodiment of the present invention.
Figure 13:
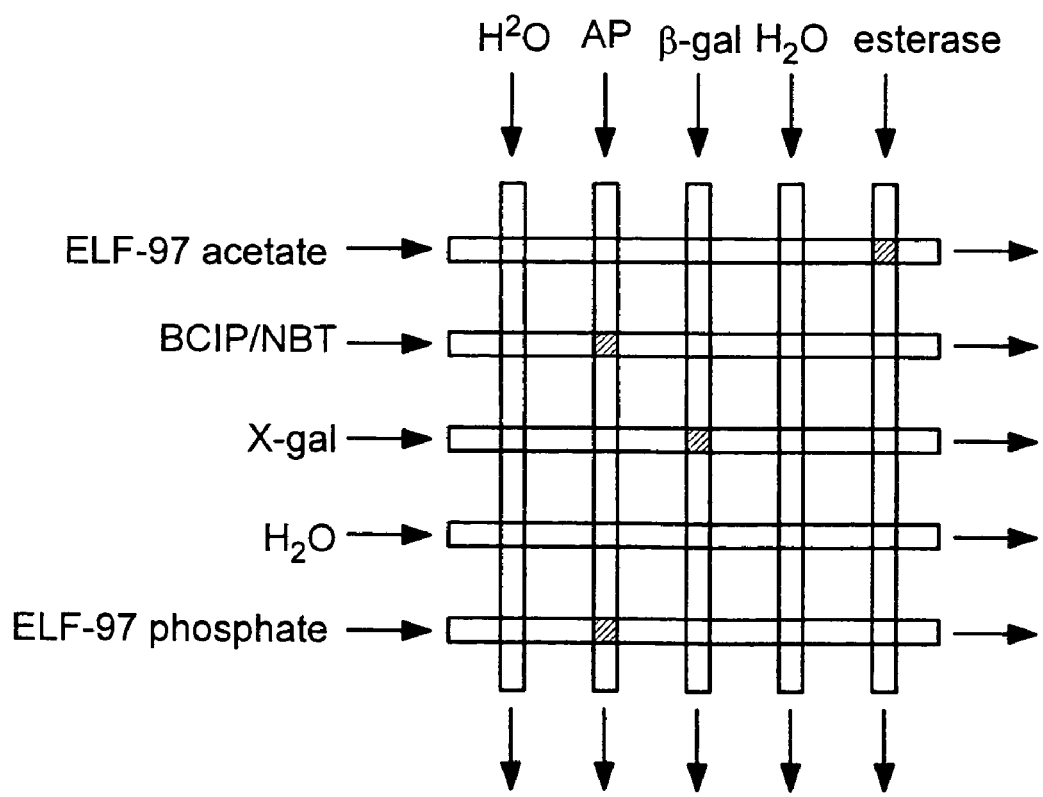
FIG. 13 is a top, plan view of a fluidic system according to another embodiment of the present invention.

A fluidic system with a convection controller including a space in the form of a microwell was used to demonstrate that detection of bacteria by agglutination of test beads was possible, as illustrated in FIG. 10. The convection controllers included two polycarbonate membranes 52 with approximately 1.0-µm pores separating a microwell from two upper fluid paths 20, containing Staphyloslide™ Latex beads (VWR Pittsburgh, Pa.), and a bottom fluid path 30, containing *Staphylococcus aureas*. The membranes were permeable to both beads and bacteria. The upper fluid paths were filled with two types of blue Staphyloslide™ Latex beads. The first fluid path was filled with a suspension of test beads coated with human fibrinogen and immunoglobulin G (IgG) on their surfaces.

The second fluid path was filled with a suspension of control beads without fibrinogen or IgG on their surfaces. The bottom fluid path was filled with a suspension of *Staphylococcus aureas* (ca. 10$^9$ bacteria/mL). The pressure was made slightly higher in the fluid path with bacteria relative to the fluid paths with beads to maintain weak flow of bacteria into the fluid paths containing the beads. The fluid flow was maintained by gravity, and the pressure in the fluid paths was regulated by controlling the height of fluid in reservoirs connected to the inlets. When bacteria came into contact with the test beads, protein A on the surface of the bacterial cell wall bound to the Fc region of IgG on multiple beads, and the beads agglutinated. Agglutination was visible only at the contact region 54 where the test solution and the bacteria came into contact. Agglutination occurred on the surface of the membrane in the fluid path containing the beads.

This experiment demonstrates that it is possible to detect the presence of bacteria by the agglutination of test beads and that embodiments of the present invention are useful as biological assays.

Example 3

To demonstrate the use of a system that incorporated a functional gel, a combination of colorimetric and fluorometric assays in a 5×5 fluid path array were used, as illustrated in FIGS. 12-15. The substrates were first immobilized in agarose gels 34 in one set of parallel fluid paths, then the solutions of enzymes were injected into the other set of fluid paths. The agarose did not flow and, therefore, balancing of pressures within the fluid paths was not required. In this experiment, the enzymes diffused from their respective fluid paths, through a membrane convection controller, as described in Example 1, and into the fluid paths that contained the gels with the substrates. Chromogenic substrates 5-bromo-4-chloro-3-indolyl galactoside (X-Gal) and a combination nitro blue tetrazolium/5-bromo-4-chloro-3-indolyl phosphate (NBT/BCIP) (all from Molecular Probes, Eugene, Oreg.) were used to detect the activities of β-galactosidase (β-gal) and alkaline phosphatase (AP), respectively (both from Sigma-Aldrich, St. Louis, Mo.). Cleavage of these substrates generated a dark blue precipitate localized at the contact region of the fluid paths.

Fluorogenic ELF-97 phosphate and acetate (both from Molecular Probes, Eugene, Oreg.) were used to detect enzymatic activity of alkaline phosphatase (AP) and esterase (Sigma-Aldrich, St. Louis, Mo.). When an enzyme cleaved the O—R bond of the ELF-97 substrate, an intensely fluorescent precipitate of ELF-97 alcohol formed at the contact region of the fluid paths. This assay was especially suited for parallel screening because all substrates generated the same fluorescent compound upon cleavage. FIGS. 14 and 15 show detection of esterase, β-galactosidase, and alkaline phosphatase (the latter by two independent assays).

This experiment demonstrated the viability of a fluidic system incorporating a functional gel. Furthermore, several samples were able to be analyzed simultaneously and in a small volume, and the results of the analyses were able to be compared directly. Each sample analyzed in this system left a pattern of signals that corresponded to its enzymatic activity. It is believed that this method will be useful for analysis and identification of complex mixtures of enzymes in biological samples, and as a tool in biomedical assays.

Example 4

In order to demonstrate the utility of a fluidic device and related methods of the invention incorporating both a gradient generator, and patterned interaction material, an FIA (serial-dilution fluorescent immunoassay) device was constructed and operated. The FIA was performed for or the presence of HIV antibodies in HIV-positive human serum (Golden West Biological, Inc.). In traditional immunoassays for HIV, viral proteins or peptides are immobilized on microtiter plates, and a serum sample containing antibodies against these proteins is serially diluted and incubated with the plates; the antibodies immobilize on the adsorbed viral proteins. A secondary antibody conjugated to either an enzyme or a fluorophore is used to quantify these antibodies. The most common formats for immunoassays for HIV test for the presence for only one antibody; embodiments of the method and apparatus of the present invention allow testing for multiple HIV antibodies simultaneously. The present example is performed using two antibodies, but the method is generalizable to 10-100 antibodies. These antibodies are directed against the HIV envelope glycoproteins GP 41 and GP 120 (referred to herein as anti-GP41 and anti-GP 120) from human serum (Protein Sciences, Inc.). A fluorescent mouse anti-human IgG (secondary antibody derived from mouse that recognized both anti-GP 41 and anti-GP 120) (Sigma) is used for readout of the concentrations of anti-GP 41 and anti-GP 120.

Figure 21:
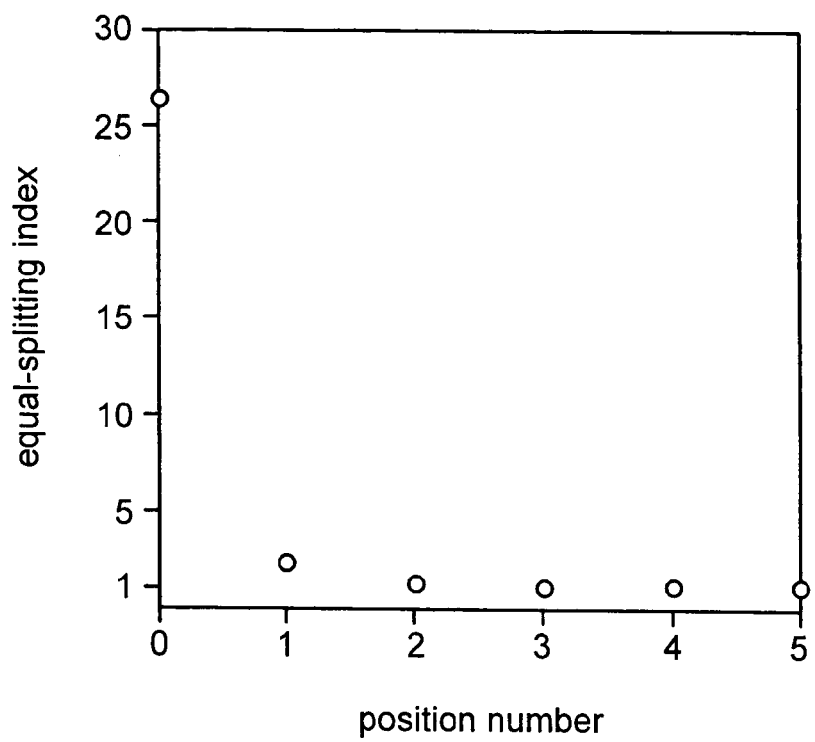
FIG. 21 is a plot of equal-splitting index versus position number.

This example uses a microfluidic device according to the present invention with two components to perform the miniaturized FIA. The first component is a gradient generator that makes use of a CAM to mix fluid streams (see FIGS. 17 and 20). The gradient generator mixes and dilutes a fluid containing an interaction material—here a sample of analytes (the antibodies contained in the serum)—with a dilutant—here buffer—into a series of solutions containing exponentially decreasing concentrations of antibodies. The microfluidic network has two inlets, one for the serum; the other for the dilution buffer (5% bovine serum albumin, BSA, used to block non-specific interactions between antibodies and antigens). In each fluid path where two streams meet, the CAM causes efficient mixing, resulting in equal redistribution of the solutions between the left and right halves of the fluid path. This mixing is illustrated in FIG. 20, section C, parts 0-5, which show the mixing within the channel (looking into the direction of flow) at 0, 1, 2, 3 and 4 mm (points 0 to 4) and at the point where the steam splits in two (5). FIG. 21 shows the equal splitting index at each of points 0-5. The equal splitting index is defined as the ratio between the average intensities of the two halves of the fluid path with the higher intensity as the numerator and the lower intensity as the denominator. Accordingly, an index of one indicates complete mixing. FIG. 21 also demonstrates that mixing occurs relatively rapidly, and is nearly complete at point 3.

Figure 22:
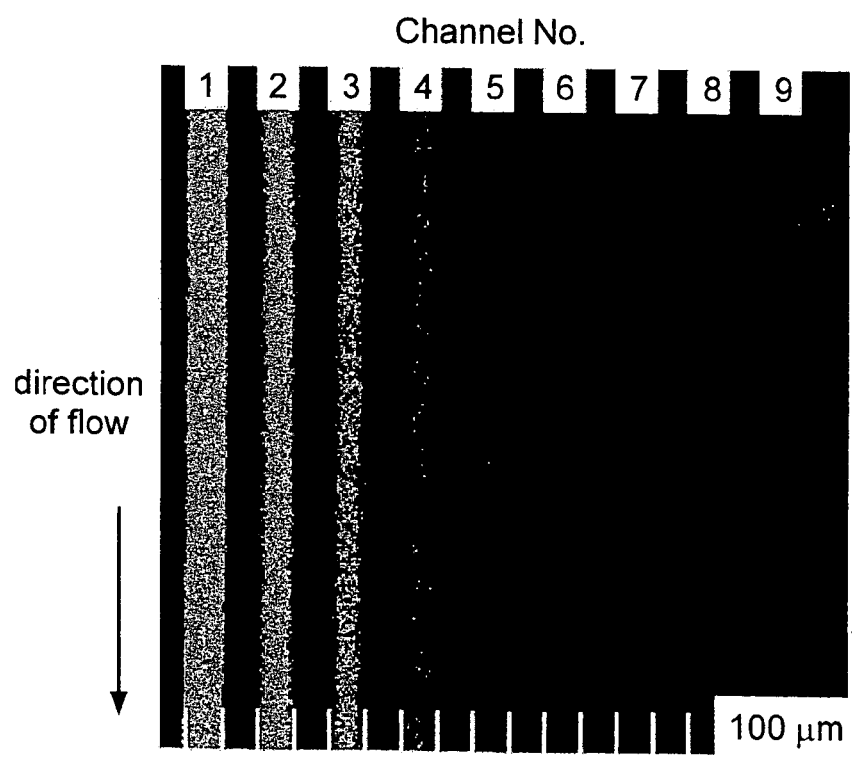
FIG. 22 is a photocopy of a photomicrograph of a fluidic system according to another embodiment of the present invention.
Figure 23:
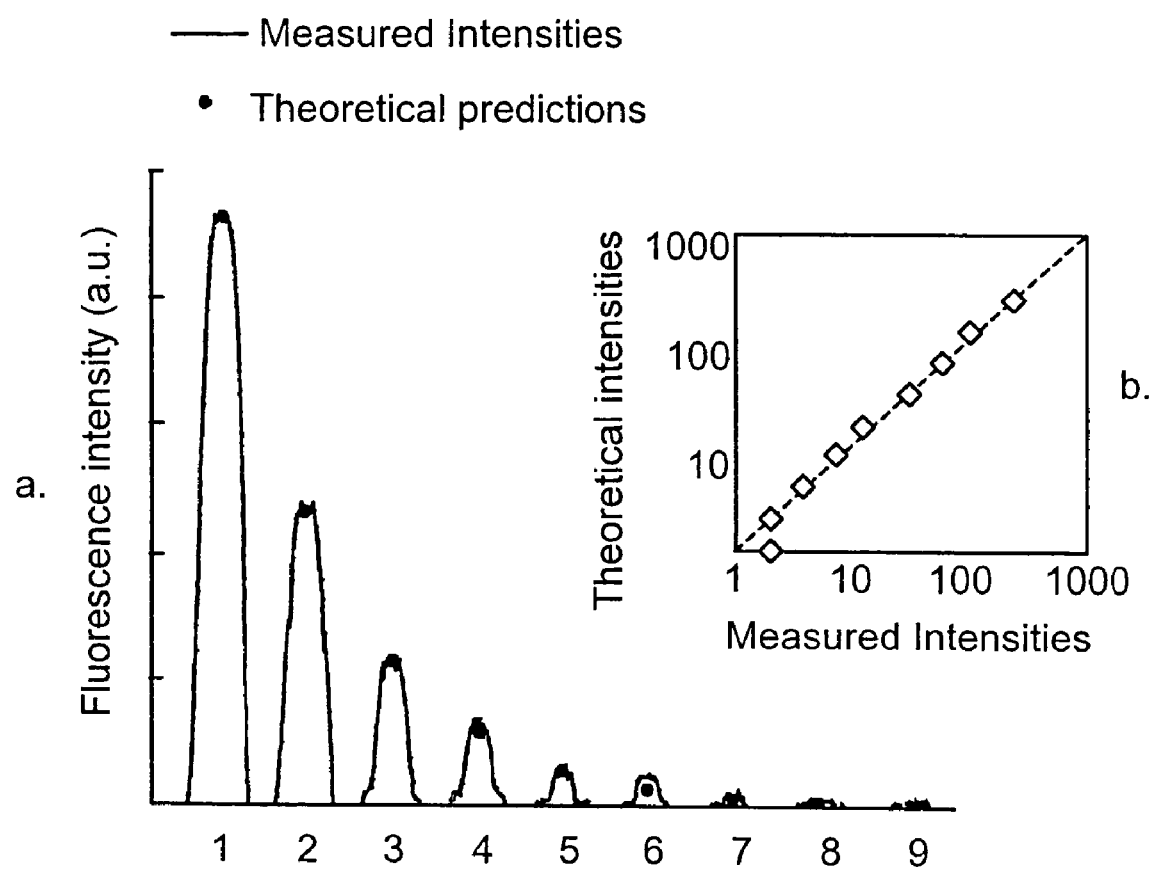
FIG. 23 section (a) is a plot of fluorescence intensity in absorbance units (a.u.) versus fluid path and section (b) is a plot of theoretical intensity versus measured intensity.

Using the above-described design, it was possible to achieve substantially exactly 1:1 mixing at each of the mixing sites. When the serum solution and the BSA solution were initially mixed, the concentration of the antibody was decreased by half. The fluid path with the mixed stream was then split into two halves; one of the streams was maintained in a separate fluid path and the other was again mixed 1:1 with BSA. Each successive mixing decreased the antibody concentration by half. Using 1:1 dilutions (i.e., a mixing factor of 2) in 10 sequential repetitive mixings, it was possible to achieve a dynamic range of $2^{10} \approx 10^3$ for a fluid path network with 10 dilutions using (a 1:3 dilution would achieve a dynamic range of $10^6$, with the same repetition of mixing). The design of the microfluidic system illustrated in FIG. 17 generates a series of streams with exponentially-decreasing concentrations, as long as proper division and redistribution of the analyte is ensured (when the mixing fluid path is split, each succeeding fluid path inherits half of the original concentration). One of the ways to achieve proper division is to generate a homogeneous solution after mixing, for instance, in our case with the CAM. As described in the detailed description, incorporation of any other types of components into the microfluidic system that provide substantial homogenization (i.e. any mixer) or even the proper splitting of the analyte will work in this design. (See FIG. 20 for additional information.) To test for mixing ratios generated by the gradient generator, BSA-FITC (bovine serum albumin conjugated to fluorescein) was diluted against phosphate buffer saline (PBS). FIGS. 22 and 23 show the result obtained with a microfluidic system that makes eight consecutive dilutions. The dots indicate theoretical values calculated from the fluorescence intensity of the first channel and reducing it be 50% for each dilution. Agreement between observed and expected values is good (FIG. 23, section b).

Figure 24:
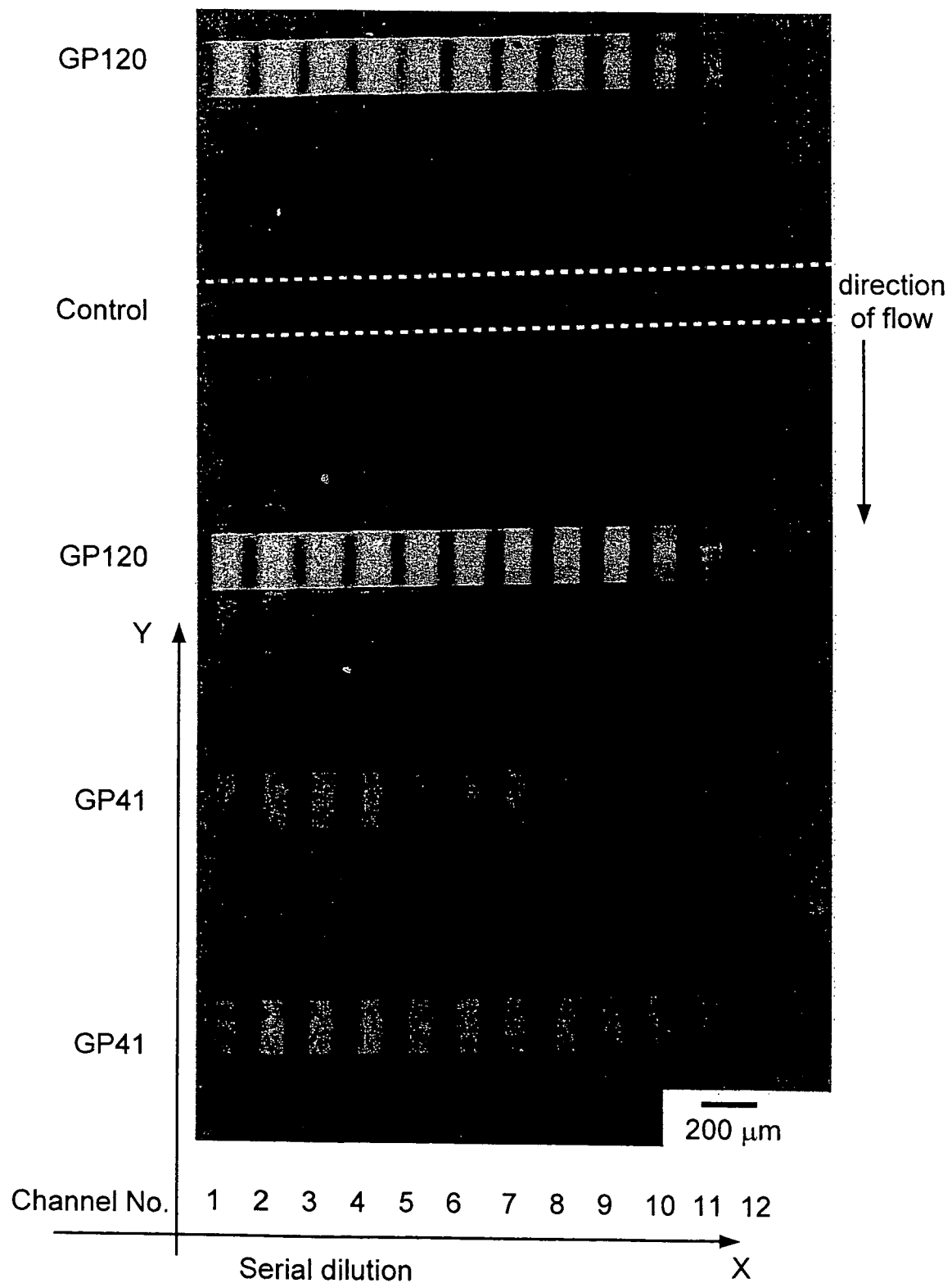
FIG. 24 is a photocopy of a photo of one aspect of the present invention.

The second important component of the embodiment of the microfluidic system of this example is substrate—here a polycarbonate membrane (Osmonics, Inc.)—presenting interaction material—here the antigens—patterned in microstripes. Recombinant HIV coating glycoproteins GP 120 and GP 41 were adsorbed onto separate arrays of microstripes on a hydrophilic, polycarbonate membrane. This patterning step used an array of microfluid paths to deliver the antigens to the membrane, as described previously herein. The hydrophilic polycarbonate membrane contains nanoscale pores (~200 nm); these pores have large hydrophilic surfaces that both adsorb sufficient amount of proteins to give good sensitivity, and also maintain the proteins in hydrated and active forms when the membrane is temporarily dried during assembly of the system. When serially diluted serum containing anti-GP 120 and anti-GP 41 was flowed orthogonally across the stripes of adsorbed antigens, the antibodies in the serum bound to these antigens. The proteins were thus immobilized in a series of rectangular spots, formed by overlapping the antibody and antigen streams. The patterns were then washed by flowing BSA in the fluid paths. The antibodies interacted with the antigens that are adsorbed irreversibly on the membrane in a concentration-dependent manner, the same as in a typical serially diluted immunoassay. The amount of adsorbed anti-GP120 and anti-GP41 in this sample of serum was visualized using a secondary antibody tethered to a fluorophore (anti-human IgG-FITC, FIGS. 24-25). In FIG. 24, each rectangular spot represents a pairwise interaction between an adsorbed antigen and an immobilized antibody from a solution of different concentration (decreasing from left to right, with a serum free control on the far right). The fluorescent signals of the distinct micropatterns for different antigens bound to different amounts of antibodies indicate the concentrations of the antibody in the solution.

Figure 25:
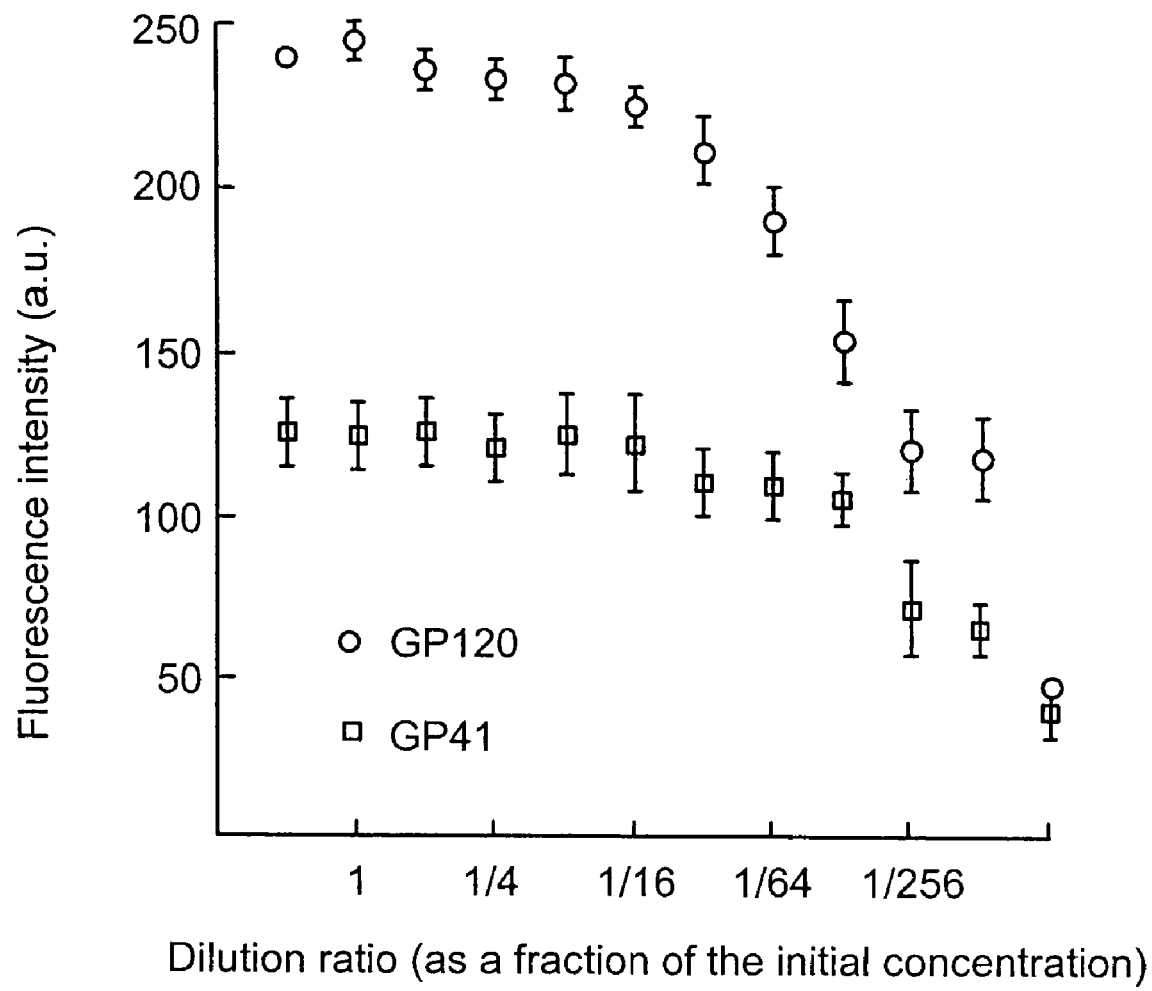
FIG. 25 is a plot of fluorescence intensity in a.u. versus dilution ratio.

FIG. 25 shows the results from three independent assays. The error bars show one standard deviation from the mean of fluorescence intensities. From these assays, it may be inferred that the patient's serum has antibodies that have high affinities to the antigens presented on the polycarbonate surface. The serial dilution experiments show that the serum is positive for both anti GP 120 and GP 41: fluorescent signals decreased rapidly in a concentration-dependent manner between fluid paths 8 and 10 of the system of FIG. 24, while keeping at a low level in fluid paths 10 and 11. Fluid path 12 is the negative control; its fluorescent signal is lower than the lowest dilutions, since in fluid paths 1-11 there are some non-specific IgGs bound to the substrate. The difference between the signals in fluid path 12 and the average signals in fluid paths 10 and 11 shows the strength of this background binding, caused by non-specific IgGs (IgGs that do not bind specifically to GP 120 or GP 41) in the serum. Between fluid paths 8 and 10, the area where the titration between the antibody and antigen is carried out, the signal decreases in a concentration-dependent manner. Before fluid path 8, the fluorescent signal is saturated for both anti GP 120 and anti GP 41. After fluid path 10, the signal no longer decreases, meaning that after this dilution, the antibodies no longer react specifically. Had such a wide dynamic range not been scanned, it would not have been possible to see a concentration-dependent change in the antibody-antigen reactions, and one might have been lead to think that either the interaction was non-specific (in the range between fluid paths 1 and 7) or there was no reaction at all (in the range between fluid paths 10 and 12).

In this assay, flowing liquids were used to ensure proper mixing inside the fluid paths. This assay differed from flow-injection assays, in that the flow speed that was typically very low (approximately 3 nL/s or 0.6 cm/s in a fluid path with dimension of approximately 100 μm×50 μm), compared with most flow-based assays (ranging from 100 nL/s to $10^5$ nL/s). Accordingly, this assay mimics traditional immunoassays in 96-wells. The same experiment was repeated with an additional incubation step (1 hour at 37° C.) where the antibodies (serum containing anti-GP 120 and anti-GP 41) were allowed to react with the antigens after the serially-diluted antibodies had been flowed in, (mimicking the incubation step done in microtiter plates in traditional 96-well plate). Less than 7% deviations in fluorescent intensities across all of the fluid paths were observed. The additional incubation step was possible because the individual fluid paths were physically separate and the diluted antibody-containing solutions from each fluid path did not mix with each other. Flows of serum and BSA sustained for 15 min-4 hours (at 3 nL/s) gave similar immobilization results, with or without a subsequent incubation step of 1 hour at room temperature.

In traditional HIV testing, positive serum reactions for any one type of antibody is typically not definitive evidence for HIV infection. Additional tests such as serum reactions to other kinds of HIV viral antigens, or Western blots are needed to confirm initial results. These experiments demonstrate that a single device according to the present invention can eliminate some uncertainties in determining HIV infection, since reactions to multiple viral antigens can be determined in a single experiment. The experiments further demonstrate that the methodology of the present invention provides a general route to quantifying the interactions between one molecule and many other molecules on the surface at the same time. Quantitative assays of multiple analytes simultaneous with very small volumes of liquid of this format may find wide uses in clinical, pharmaceutical and environmental sciences.

Example 5

In order to demonstrate that the method and apparatus of the invention may also be adapted for use in inhibition assays, such an assay was attempted. In an inhibition assay, an inhibitor that prevents binding between an antibody in solution and an antigen immobilized on a substrate is serially diluted. Using an inhibition assay it was possible to obtain the binding constant between the antibody in the solution and the antigen, as well as the concentration of the antibody in the solution.

The inhibitor (which was the same molecule as the antigen on the surface) was flowed instead of the dilution buffer into the inlet, with the rest of the experiment the same as described in Example 4. The serial dilution generated a gradient of inhibitor. Since the inhibitor competes with the surface-immobilized antigen to bind the antibody in the solution, different amounts of immobilization of the antibody on the surface was achieved. Then by assaying the amount of antibody immobilization from a second antibody that is fluorescently labeled, it was possible to determine the amount of antibody immobilization as a function of the inhibitor concentration. From the curve plotted between the fluorescence intensity (which is a measurement of the amount of immobilized antibody) and the concentration of the antigen (which was known), it was possible to obtain the binding constant between the inhibitor (antigen) with the antibody in mol/L. Performing this kind of assay in microfluidic fluid paths not only saves the volume of solution by orders of magnitude, but also enables assaying for two or more kinds of antibody-antigen interactions quantitatively in one experiment. This demonstrates that the method and apparatus of the invention may be adapted for use in inhibition assays.

Two different microfluidic devices were fabricated to determine the efficacy of the devices for a titration. Materials and reagents for Examples 6 and 7 were obtained or fabricated as described below.

Microfluidic devices were fabricated as follows: Sylgard® 184 Silicone, a two-part poly(dimethylsiloxane) (PDMS) elastomer, was purchased from Essex Brownell (Edison, N.J.). For all devices a 10:1 (by weight) mixture of PDMS base/curing agent was used and was degassed under vacuum and cured at 70° C. for ~24 hours. The reagents $Fe(CN)_6^{4-}$ (Fe(II)), $Cr_2O_7^{2-}$(Cr(VI)), $I^-$, $S_2O_8^{2-}$, KCl, and HCl were obtained from Sigma-Aldrich Co. (St. Louis, Mo.) and used as received; solutions of these reagents were made in 18 MΩ water. All other chemicals were purchased from Sigma-Aldrich Co. and used as received unless indicated otherwise.

Channels that were 50 μm high and had various structures (e.g., herringbone) on the top walls of the channels that were also 50 μm high were fabricated in PDMS by replicating a master obtained by conventional photolithography. The SU-8 channel structure on the master was prepared on a silicon wafer by a two-step photolithographic process. The channels were embedded in PDMS and were aligned to a glass slide bearing platinum electrodes under an optical microscope. The device was sealed by using clamps that applied a small pressure to the device. The PDMS slab and the glass slide were sealed reversibly; this reversible seal allowed reuse of the glass slide bearing the electrodes several (~5) times.

Electrodes were fabricated as follows: Microscope slides (75×50×1 mm, borosilicate glass, Corning, N.Y.) were used as supports for the electrodes and to close the channels embedded in PDMS. To fabricate the electrodes, the glass slides were first cleaned (using water and ethanol) and then treated with hexamethyldisilazane (Microelectronics Materials Corp.) to promote the adhesion of the Shipley 1813 photoresist (Microchem Corp.). Photoresist was spin-coated at 500 rpm for 5 s and at 4500 rpm for an additional 30 s to give a thickness of ~1.2 μm. The slides were then placed directly on a digital hotplate set at 105° C., baked for 3 min, and promptly removed. A computer-aided design (CAD) program was used to design the shape of the electrodes; this design was printed onto a transparency film (PageWorks, Cambridge Mass.), which served as a photomask for photolithography. The photomasks were placed on top of the resists, and the resists were exposed to UV light for 6 s at 50 mJ s$^{-1}$. The resists were then immersed in fresh 351 developer (Microchem Corp., composition 80% NaOH and 20% $H_2O$) with agitation from a Branson 251 sonifier (VWR Corp.). Within 1 min, the exposed regions began to exude a red color, indicating that development of the photoresist had begun. The agitation was continued until formation of the red color ceased and the resulting pattern attained a uniform appearance (~30 s). After rinsing the slides thoroughly with 18 MΩ water, they were dried under a stream of $N_2$. 7.5 nm of titanium (to promote adhesion) was evaporated sequentially with 200 nm of Pt onto the patterned slides using an electron beam evaporator. The remaining photoresist was removed by immersing the slides in an acetone (or ethanol) bath and then sonicating them. Peeling off the photoresist revealed the metallic patterns formed on the slides that were to be used as electrodes.

Alignment of the electrodes and microfluidic channels is shown in FIG. 4A. Since all of the electrodes (except for the first) cross under several channels of the system, the electrodes needed insulation from all of the channels except one, where detection takes place. Each electrode was arranged to detect the solution in the right-most channel crossing over the electrode. In each of these positions, a small aperture (100 µm×100 µm) in a thin layer of photoresist allowed contact between the electrode and the solution flowing in the channel above it. To make this insulating layer, a thin layer (~10 µm) of SU 8-2005 photoresist (Microchem Corp.) was spun (5 s at 500 rpm and 15 s at 900 rpm) on the glass bearing the electrodes. A photomask having the pattern of the apertures on top of the electrodes was aligned and exposed system to UV light. The resist was developed in a propylene glycol methyl ether acetate (PGMEA) bath for 2 mins, leaving the apertures (100×100×10 µm, lwh) in the resist.

One of the platinum microelectrodes was converted to a reference Ag/AgCl electrode by applying a potential difference of 800 mV between the Pt integrated microelectrode and an external Pt macroelectrode. The electrodes were immersed in a solution of commercial silver bath (Techni-Silver EHS-3, Technic Inc.) and the Pt microelectrode was polarized as a cathode in order to electroplate Ag on the Pt. Then, after immersing the electrodes into a saturated KCl solution, a potential difference of 800 mV was applied for ~15 s to the electrodes (the newly formed Ag/Pt electrode polarized anodically), in order to form an AgCl layer (~100 nm in thickness).

To perform the experiments, solutions of titrant and sample were placed in 5 mL syringes (Becton, Dickinson and Co.) without the plunger; these syringes were used as reservoirs. These syringes were attached to polyethylene tubing (Intramedic, PE 20) that connected to the inlets of the device. The solutions were allowed to flow by gravity. The flow rate of each solution was adjusted by changing the height of each reservoir. The relative flow rates of the solutions in the inlets were calibrated to obtain 1:1 splitting at each junction by viewing the splitting under an optical microscope. Flow rates were measured at the outlet (waste) by weighing the amount of solution recovered at the end of the device during a fixed period of time.

A difference in potential between a Pt electrode located in one of the channels and the Ag/AgCl reference electrode was measured using a Fluke 75 Multimeter. One Pt electrode was connected to the voltmeter, the measurement was taken, the electrode disconnected and then the adjacent one was connected. The measurements can be detected simultaneously by connecting the electrodes of a device to a connector block (e.g., TBX-68 I/O, National Instruments), which sends electronic signals to a data acquisition card (e.g., PCI card) that connects to a computer. The signals can be read by a software program such as LabVIEW (National Instruments).

Example 6

Figure 26:
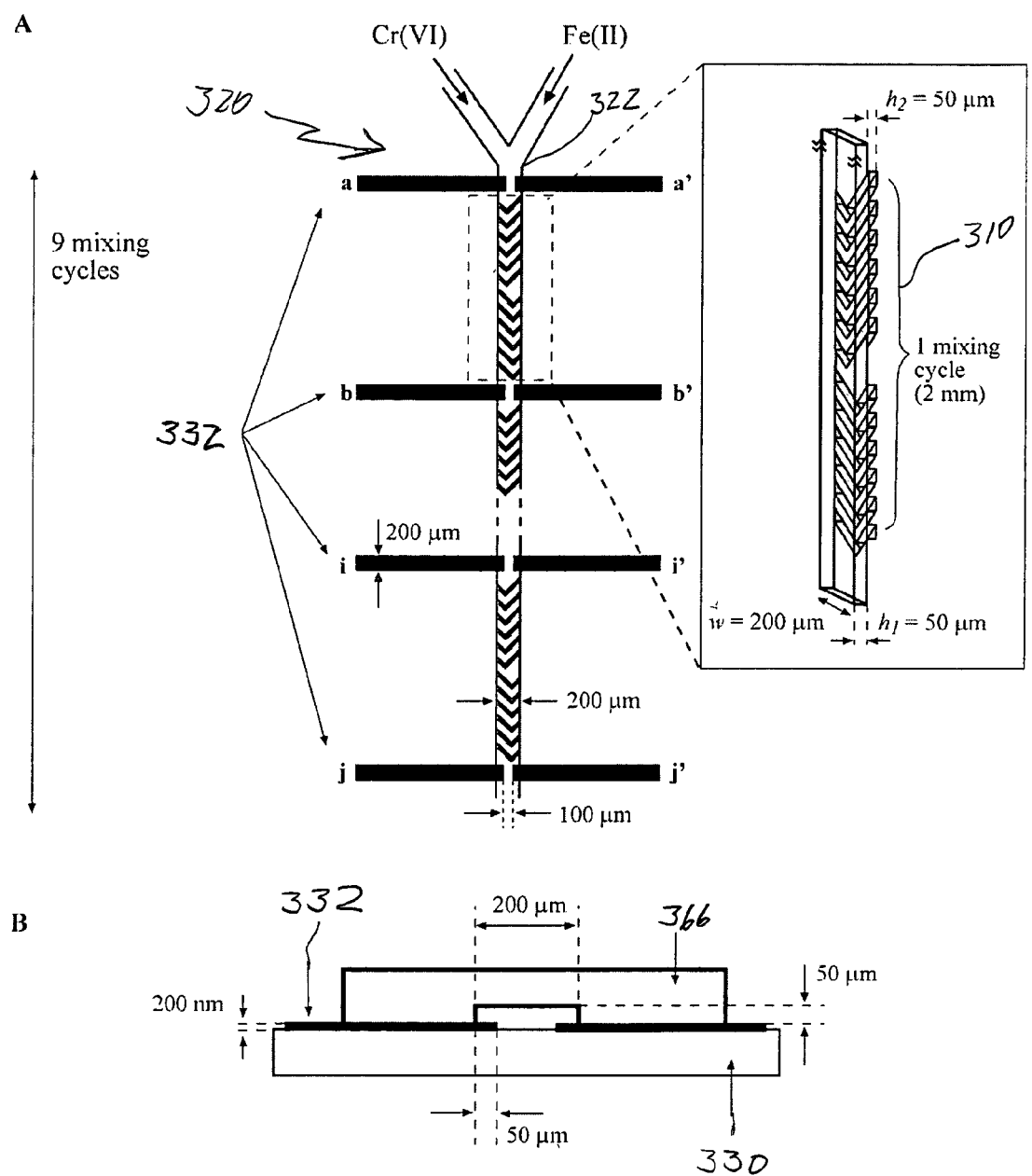
FIG. 26 section (a) is a plan view of a fluidic system of the invention and includes an enlarged portion showing a mixing region, and section (b) illustrates the device of section (a) in cross-sectional view.

One of the fabricated devices is shown in FIG. 26 and was used to characterize the efficiency of mixing using electrochemical tools.

A potentiometric titration between an oxidant and a reductant may proceed faster when an efficient mixing of the two solutions occurs. In microfluidic channels, mixing of two solutions may be slow due to the laminar behavior of the flow. The use of a chaotic advective mixer (CAM) using a ribbed microstructure in the flow channel may aid in mixing.

As shown in FIG. 26, a CAM 310 forms part of a microfluidic device that was used to evaluate titration efficiency. A microchannel 320, including a Y-junction 322 and integrated ribbed microstructures, in the shape of herringbones, on the top wall of the channel was fabricated using soft-lithography. A glass support 330 bearing ten pairs of platinum electrodes 332 closed the microchannel. The electrodes were aligned using an optical microscope and were positioned in the microchannel between two consecutive herringbone cycles. Mixing efficiency was determined by flowing an oxidant and a reducing agent through the device and measuring the potential between each pair of dual-facing electrodes after each herringbone cycle.

A second device, illustrated in FIG. 27, was used to mix and dilute a sample solution with a titrant solution. The dilution process produced a series of solutions containing exponentially decreasing redox potentials that were used to generate a titration curve, with a reading from each solution becoming a point on the titration curve. In this example, the microfluidic device included 11 channels (50 µm deep and 100 µm wide, FIG. 28A). Two inlet reservoirs 340 and 342 supplied i) the sample that was analyzed, and ii) the titrant solution to inlets 344 and 346. At the junction 348 (200 µm wide) between the channel supplying the sample solution and the channel supplying the titrant solution (both channels 100 µm wide), herringbone microstructures (nine cycles) placed on the top wall of the junction provided efficient mixing and complete reaction between the sample and the titrant solutions. In the embodiment shown, the serial dilutor provided a dilution factor of ~2; that is, at each junction, the solution injected into inlet 344 split into two halves. One stream flows to the outlet (waste) without further dilution; the other mixed 1:1 with the solution injected into inlet 346 to produce a solution of lower concentration.

Figure 29:
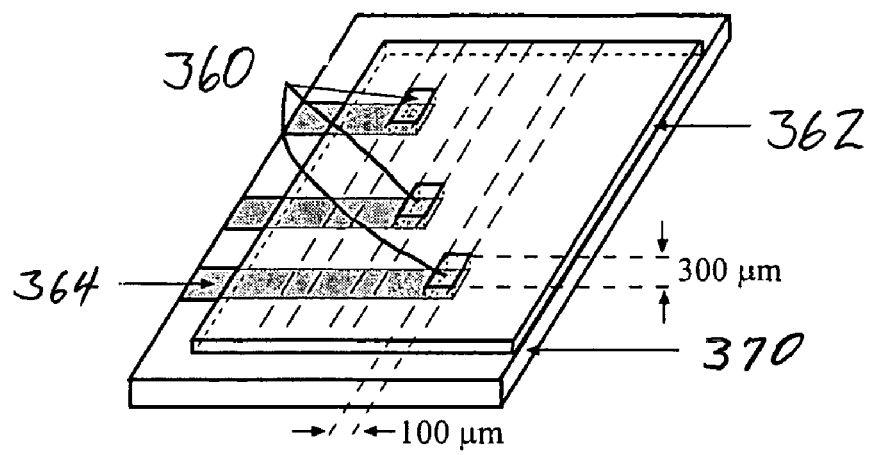
FIG. 29 section (a) provides a perspective view of an enlarged portion of the device of FIG. 28, and section (b) provides a cross-sectional view of the same.
Figure 29:
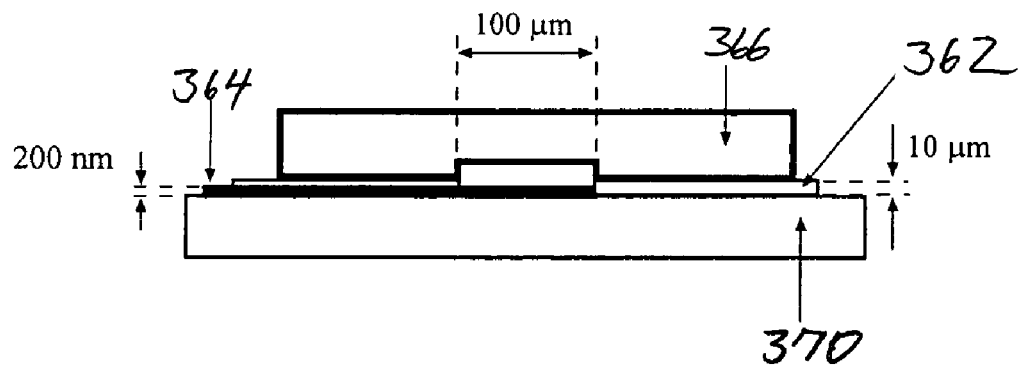

The electrochemical measurements took place at the end of the channel system, just before all of the microchannels reconnected to produce a waste stream 350 (FIG. 27). At these detection points (FIG. 29), small apertures 360 (100 µm×100 µm) in a thin layer of photoresist 362 (10 µm) allowed contact between a platinum electrode 364 and the solution flowing in the channel above it. In all other areas where the electrodes crossed the channels, the layer of photoresist 362 insulated the solution from the electrodes. A silver/silver chloride electrode 368 was exposed to a fluid consisting 100% of the fluid entering inlet 344. The photoresist 362 was deposited on a 1 mm thick glass support 370. An optical microscope aided the alignment between the PDMS slab 366 and the electrodes.

Two solutions were injected into the device depicted in FIGS. 27 and 28. One was a strong oxidant, $Cr_2O_7^{2-}$ (Cr(VI)), used as the titrant, and the other a reducing species, Fe $(CN)_6^{4-}$ (Fe(II)), used as the sample. To each of the solutions was added ~0.1 M KCl and ~$10^{-3}$ M HCl (until each solution reached pH≅3) to provide an acidic condition for the titrations and for the electrolyte composition required by the Ag/AgCl reference electrode. Reservoirs 340 and 342, containing the titrant and sample solutions, were placed ~30 cm above the device (FIG. 28B). These solutions were allowed to flow into inlets 344 and 346 by gravity. The flow rate, measured at the end of the channel system, was ~1 µL/s. The level of fluid in each of the reservoirs was nearly constant during the duration of the experiments (several minutes) as the volume of solution in the reservoir was large (~3 mL) compared to the volume of solution in the microchannels (~6 µL). The relative flow rates of the sample and the titrant solutions were calibrated before use by adjusting the heights of the reservoirs, as differences in pressure and flow rate in the two channels can change the dilution factor of the device, and may contribute to inaccuracies in the measurements.

Once the microchannels had filled completely (total internal volume ~6 μL), the potentials were measured manually at the electrodes using a voltmeter. Simultaneous measurements in each channel could be performed by combining an electronic read-out system (e.g., LabVIEW) to this microdevice. Results may be the same whether potentials are measured sequentially or simultaneously. At the end of the channel network, the fluid in each channel combined into waste stream 350. The output stream (here, "waste") had the characteristic of a controlled lateral gradient in redox potential.

Example 7

A group of experiments were run to characterize the efficiency of electrochemical mixing using the system illustrated in FIG. 26. Mixing efficiency was measured at different points along a single channel that included nine sections of CAM and was compared to mixing along a channel without the herringbone structures. Platinum electrodes 332 were integrated into each side of the channel in both microchannels (FIG. 26). These electrodes faced each other and were 100 μm apart across the width of the channel. Each pair of electrodes was separated from the next pair by 2 mm along the length of the channel.

Figure 30:
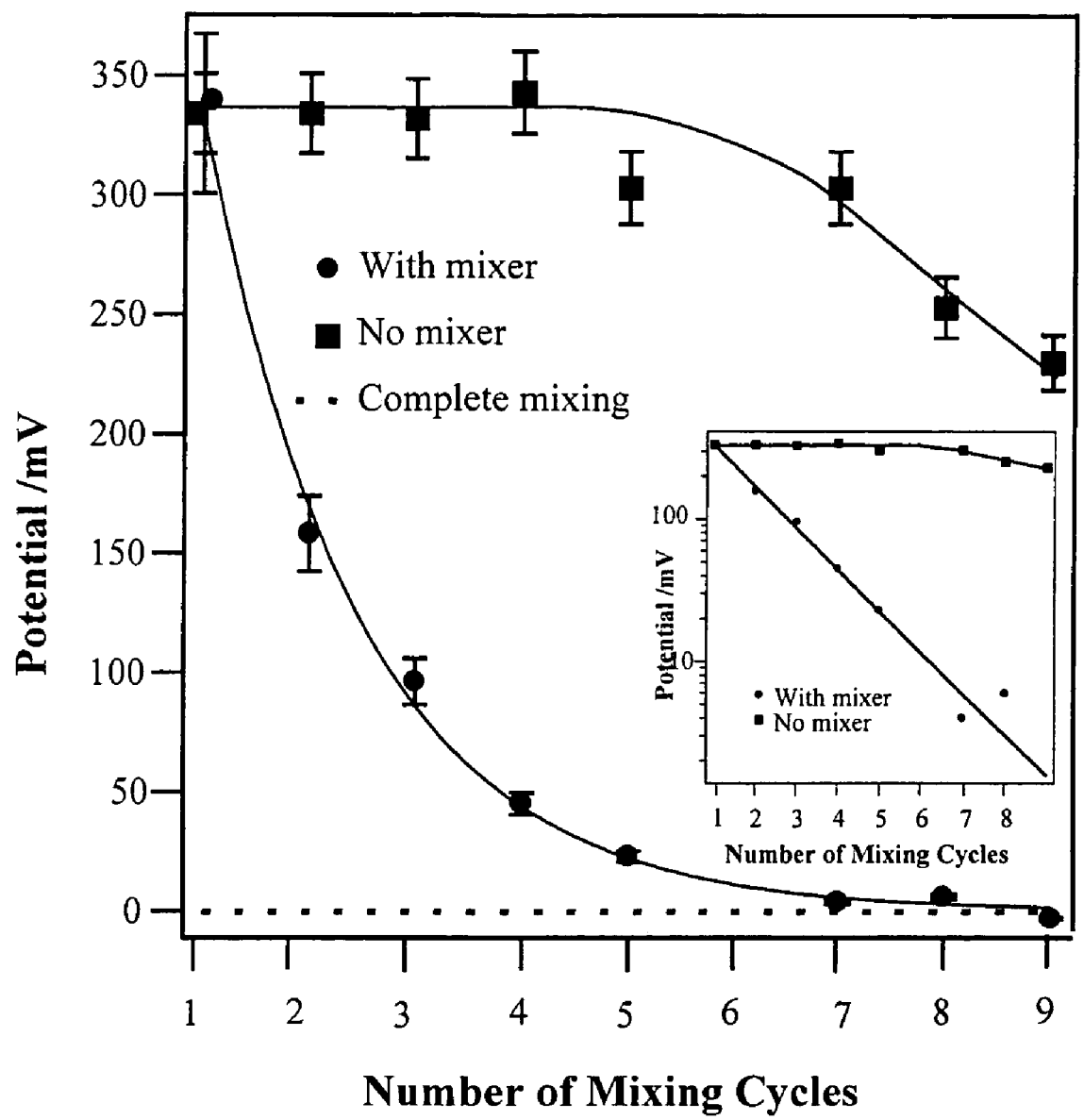
FIG. 30 is a graphical representation of experimental results for one embodiment of the invention.

FIG. 30 graphically illustrates the potential measured between a series of these dual-facing platinum electrodes when solutions of Fe(II) and Cr(VI) were flowing in a single channel. Without the mixing structures, flow in the channel was laminar and mixing of the reagents occurred due to the diffusion of the ions from one stream to an adjacent stream. The potential thus varied only slightly along the channel, as the rate of reaction of the reagents was slow. Without a CAM, results indicate that complete mixing was not achieved by the end of the channel; the difference in potential between the last pair of facing Pt electrodes reached a value of ~250 mV. Incorporating the CAM caused the potential to decrease after each CAM section, and enabled the potential to reach ~0 mV at the end of the microchannel, indicating that complete mixing occurred. FIG. 30 indicates that mixing was substantially complete after five sections of CAM at a flow rate of ~1 μL s$^{-1}$.

The microfluidic titration device represented in FIG. 27 was characterized by allowing fluorescein to pass through inlet 344 and water to pass through inlet 346, and measuring the changes in fluorescence intensity in each channel (using a fluorescence microscope) after each successive dilution. The device was designed to obtain an exponential dilution pattern at the outlet with a theoretical dilution factor of two. The empirically measured dilution factor was 2.2, averaged over all of the junctions of the device and over three different experiments. The relationship between c and n is exponential (eq. 1) where $c_n$ is the concentration of the analyte in channel n (where n ranges from 1 to 11 in this work) and c is the initial concentration:

$$c_n = \frac{1}{2.2^{n-1}} c \qquad (1)$$

Channel n=1 corresponds to the channel that contains the solution injected into inlet 344 (0% dilution). Channel n=11 corresponds to the channel that contains 100% of the solution injected into inlet 346, i.e., this solution flows to the end of the device without being mixed with any solution from inlet 344.

In the case of potentiometric measurements, if a redox-active species (a reductant R, for example) is injected into inlet 344, the potentials measured in each channel follow the Nernst equation and are therefore proportional to the logarithm of the concentration in each channel, i.e., E∝ln(c), if the concentration of the oxidant is kept constant. The relationship between E and n is thus linear for the case of these channels for a constant concentration of oxidant (eq. 2).

$$E_n = E^\circ + \frac{RT}{\alpha F}\ln(c_{O_x}) - \frac{RT}{\alpha F}\ln(c) + \frac{RT}{\alpha F}\ln(2.2)^{(n-1)} \qquad (2)$$

$C_{Ox}$ is the constant concentration of the oxidant, α the number of electrons exchanged between the reductant and the oxidant, E° the formal redox potential of the oxido-reductant couple, R the gas constant, T the temperature, and F the Faraday constant. Thus, an exponential concentration gradient of a redox species results in a linear gradient of the electrochemical potential.

The redox systems Fe(II)/Fe(III) and Cr(III)/Cr(VI) was investigated in the microfluidic device shown in FIG. 27. The redox reaction between Cr(VI) ($Cr_2O_7^{2-}$, considered here as the titrant) and Fe(II) ($Fe(CN)_6^{4-}$, considered as the sample) is summarized by eq. 3:

$Cr_2O_7^{2-} + 6Fe(CN)_6^{4-} + 14H^+ \rightarrow 2Cr^{3+} + 6Fe(CN)_6^{3-} + 7H_2O$ (3)

The network offered two injection schemes: i) the case where the sample was injected into inlet 344 and the titrant into inlet 346, and ii) the reverse case, where the titrant was injected into inlet 344 and the sample into inlet 346. Results indicate that the choice of the injection scheme has an influence on the detection limit of the device.

First, a solution of Fe(II) (100 mM) was injected into inlet 344 and a titrant solution of Cr(VI) was injected into inlet 346. In order to have an optimal determination of the sample concentration, the dilution ratio exhibiting a titration end-point (i.e., the point in the titration where 99% of the sample has reacted with the titrant) may be located in one of the middle channels (i.e., 3<n<8). The location of the titration end-point depends on the relative concentrations of the sample and the titrant.

Figure 31:
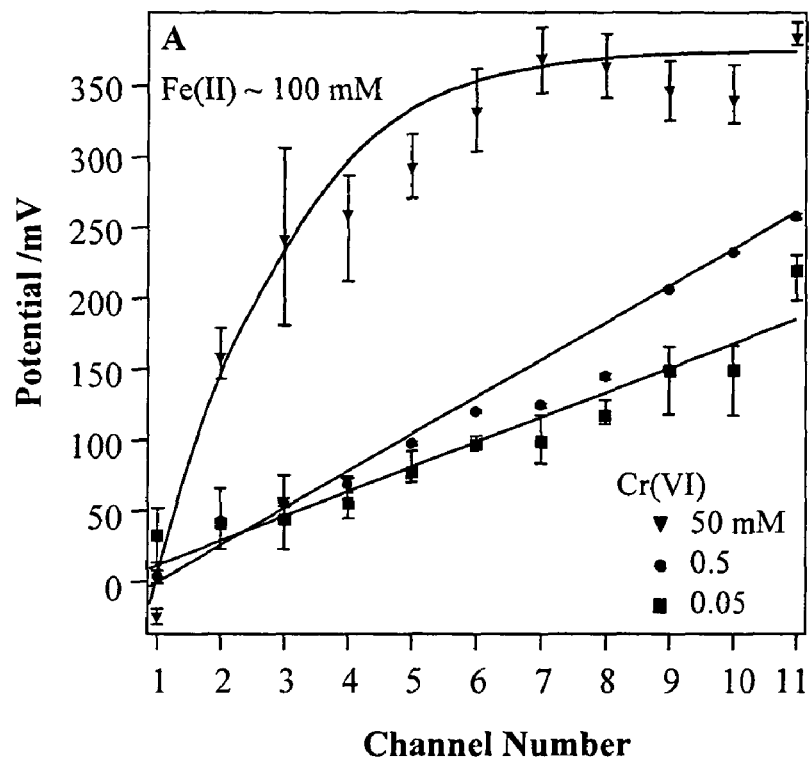
FIG. 31 section (a) provides a graphical representation of experimental results and section (b) provides a graphical representation of a transformation of the data shown in section (a)
Figure 31:
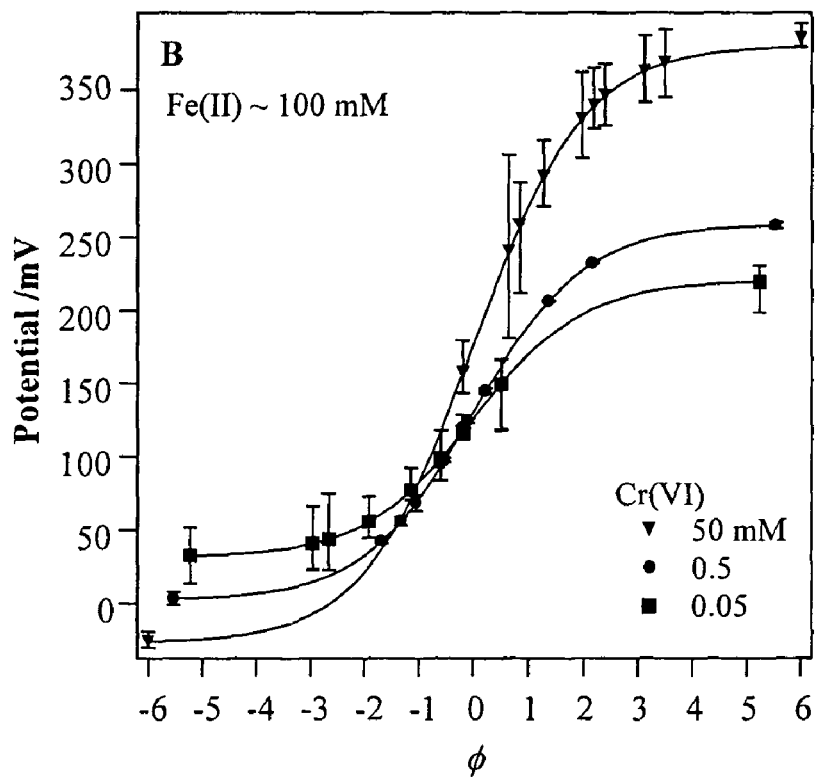

Three different concentrations of Cr(VI)—0.05, 0.5 and 50 mM—were tested in order to demonstrate the influence of this parameter on the location of the titration end-point in the channel. FIG. 31A shows the potentials measured in each channel relative to a common Ag/AgCl reference electrode; the data are plotted against the channel number, n.

Since the representation E vs. n (FIG. 31A) may not allow a straightforward recognition of the titration end-point, and because a sigmoidal shape is more convenient for determining this point, a function defined by eq. 4 was applied to the experimentally measured potentials. Here, $E_{min(Fe)}$ is the potential measured when the solution of the sample contains only Fe and no Cr (that is, in channel 1), $E_{max(Cr)}$ is the potential measured when the solution of the titrant contains only Cr and no Fe (that is, in channel 11) and n ranges from values of 2 to 10.

$$\phi_n = \ln\left[\left(\frac{E_{min(Fe)} - E_{max(Cr)}}{E_n - E_{max(Cr)}}\right) - 1\right] = \ln\left[\left(\frac{E_1 - E_{11}}{E_n - E_{11}}\right) - 1\right] \qquad (4)$$

This mathematical expression is derived from the sigmoid function, eq. 5, which gives a sigmoidal relationship between any parameters y and x; $A_1$ and $A_2$ are two constants defining the minimum and the maximum values that can be reached by y, $x_o$ is the abscissa corresponding to the mid-point between $A_1$ and $A_2$, and dx is a normalizing factor.

$$y = \frac{A_1 - A_2}{1 + e^{\frac{(x-x_o)}{dx}}} + A_2 \quad (5)$$

Eq. 5 can be rewritten as eq. 6 when applied to this data set, where n ranges from values of 2 to 10:

$$E_n = \frac{E_{min} - E_{max}}{1 + e^{\phi}} + E_{max} = \frac{E_1 - E_{11}}{1 + e^{\phi_n}} + E_{11} \quad (6)$$

Eq. 4 allows the redistribution of the experimental points between a maximum and a minimum value. In eq. 4, when the function φ equals 0, the potential corresponds to the inflexion point of the sigmoid, i.e., the end-point of the titration.

FIG. 31B shows the sigmoidal representations of the experimental points presented in FIG. 31A that were obtained using this transformation. For the case of a 0.5 mM solution of Cr(VI) and a 100 mM solution of Fe(II), the titration end-point (which we call the "experimental end-point") corresponded to channel 7, in good agreement with the titration end-point determined by calculations (the "theoretical end-point"). Table 1A summarizes the influence of the relative concentrations between the titrant and the sample on the titration end-point. Table 1A also shows comparisons between experimental and theoretical end-points for three different Cr(VI) concentration values. These results illustrate that the channel number where the titration end-point was determined experimentally shifted in agreement with the calculations.

Figure 32:
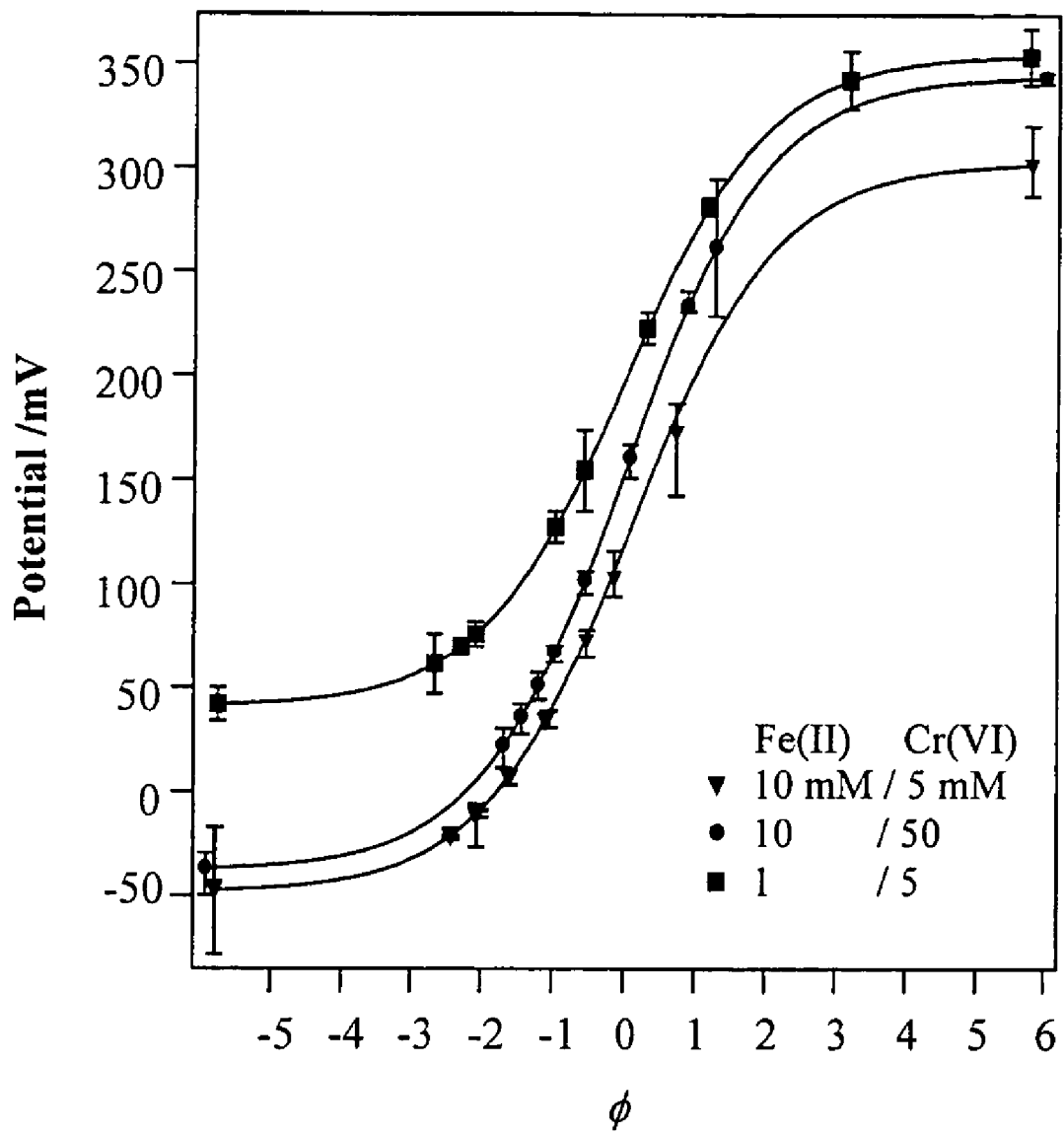
FIG. 32 provides graphical results of a potentiometric titration using one embodiment of the invention.

The injection scheme described above could only detect a high concentration of sample (Fe(II), ~100 mM) and would require titrating against a very low concentration of Cr(VI) (<0.05 mM) to reach a lower detection limit of Fe(II). In order to decrease this detection limit, a second injection scheme was evaluated by injecting the sample Fe(II) into inlet 2 and the titrant Cr(VI) into inlet 346. FIG. 32 shows the curves obtained for various concentrations of Fe(II) and Cr(VI) and Table 1B compares these values with ones predicted by calculations. One advantage of using this configuration is a lower detection limit of ~1 mM for Fe(II), a value sometimes reported for conventional potentiometric titrations. This device was also evaluated for the titration of I⁻ with $S_2O_8^{2-}$ and a similar agreement between the experimental and theoretical titration end-points was found.

The present accuracy of this device was determined to be ±1 channel. The shift of the titration end-point of one channel corresponds to a variation of the sample concentration by a factor of ~3-5 fold (since a 10-fold change in the concentration of the starting sample resulted in a shift of end-point between 2-3 channels, Table 1).

TABLE 1

Comparison between the titration end-point determined by experiments (exper. end-point) and by calculations (theor. end-point).

| | [Fe(II)] (mM) | [Cr(VI)] (mM) | Theor. end-point: Channel Number | Exper. end-point[a]: Channel Number |
|---|---|---|---|---|
| A. | 100 | 0.05 | 10 | 9 |
| | 100 | 0.5 | 7 | 7 |
| | 100 | 50 | 2 | 3 |

TABLE 1-continued

Comparison between the titration end-point determined by experiments (exper. end-point) and by calculations (theor. end-point).

| | [Fe(II)] (mM) | [Cr(VI)] (mM) | Theor. end-point: Channel Number | Exper. end-point[a]: Channel Number |
|---|---|---|---|---|
| B. | 10 | 50 | 6 | 5 |
| | 10 | 5 | 4 | 3 |
| | 1 | 5 | 6 | 5 |

[a]denotes an average of 3 experimental measurements (±1 channel)
A. Solution of Fe(II) injected into inlet 344 and Cr(VI) into inlet 346.
B. Solution of Cr(VI) injected into inlet 344 and Fe(II) into inlet 346.

It will be understood that each of the elements described herein, or two or more together, may be modified or may also find utility in other applications differing from those described above. While particular embodiments of the invention have been illustrated and described, the present invention is not intended to be limited to the details shown, since various modifications and substitutions may be made without departing in any way from the spirit of the present invention as defined by the following claims.

The invention claimed is:

1. A method of promoting interaction, comprising:
   introducing a first fluid including a first material into a first fluid path having a cross-sectional dimension of less than 1 millimeter;
   introducing a second fluid including a second material into a second fluid path segregated from the first fluid path by a convection controller positioned at a contact region, the contact region comprising an intersection between the first and second fluid paths;
   allowing the first and second materials to interact at the contact region;
   forming a product from the interaction of the first and second materials; and
   immobilizing the product at the contact region.

2. The method of promoting interaction of claim 1, wherein the convection controller carries an electrical charge.

3. The method of promoting interaction of claim 1, wherein the convection controller comprises pores about 0.05 to 0.2 micrometers in average diameter.

4. The method of promoting interaction of claim 1, wherein the convection controller comprises a portion about 5 to 50 microns thick.

5. The method of promoting interaction of claim 1, wherein the convection controller comprises a membrane.

6. The method of promoting interaction of claim 1, wherein at least one of the first fluid path and the second fluid path comprises a cross-sectional dimension of less than about 300 microns.

7. The method of promoting interaction of claim 1, further comprising maintaining a pressure within the first fluid path at the contact region substantially equal to a pressure within the second fluid path at the contact region.

8. The method of promoting interaction of claim 1, further comprising diffusing at least one of the first material and the second material into the convection controller.

9. The method of promoting interaction of claim 1, further comprising immobilizing at least one of the first fluid in the first fluid path and the second fluid in the second fluid path.

10. The method of promoting interaction of claim 1, wherein the first fluid is the first material.

11. The method of promoting interaction of claim 1, wherein the second fluid is the second material.

12. The method of promoting interaction of claim 1, wherein the convection controller comprises a gel.

13. The method of promoting interaction of claim 1, comprising an interaction material associated with the first convection controller.

14. The method of promoting interaction of claim 13, wherein the interaction material is a protein.

15. The method of promoting interaction of claim 13, wherein the interaction material is immobilized within the first convection controller.

16. The method of promoting interaction of claim 13, wherein the interaction material is immobilized on a surface of the first convection controller.

17. A method of promoting interaction as in claim 1, wherein the interaction involves binding of a protein.

18. A method of promoting interaction as in claim 1, wherein at least one of the first and second materials is associated with a bead.

19. A method of promoting interaction, comprising:
    providing a fluidic system comprising first, second and third fluid paths, wherein at least one fluid path of the fluidic system comprises a cross-sectional dimension of less than one millimeter and a first interaction material patterned therein;
    flowing at least a portion of a first fluid from a first fluid source into the first fluid path;
    partitioning portions of a second fluid from a second fluid source into each of the second and third fluid paths;
    mixing at least a portion of the first fluid with the portion of second fluid in the second fluid path to form a third fluid;
    mixing at least a portion of the third fluid with the portion of second fluid in the third fluid path to form a fourth fluid,
    wherein at least one of the first, second, third or fourth fluids comprises a second interaction material; and
    allowing interaction between the first and second interaction materials.

20. The method of claim 19, further comprising:
    observing the interaction of the first and second interaction materials.

21. The method of claim 19, wherein providing further comprises providing a fluidic system comprising a plurality of fluid paths and a first plurality of interaction materials patterned within them and wherein flowing further comprises flowing a plurality of fluids comprising a second plurality of interaction materials into the plurality of fluid paths.

22. A method as in claim 19, comprising:
    flowing the third fluid past a first sensor; and
    flowing the fourth fluid past a second sensor.

23. A method as in claim 19 comprising:
    flowing a first fluid in a first channel and a second fluid in a second channel and in a third channel;
    mixing at least a portion of the first fluid with the second fluid in the second channel to produce a third fluid; and
    mixing at least a portion of the third fluid with the second fluid in the third channel to produce a fourth fluid,
    wherein the fluid comprising the second interaction material is the first, second, third or fourth fluid.

* * * * *